US009755505B2

(12) United States Patent
Usami

(10) Patent No.: US 9,755,505 B2
(45) Date of Patent: Sep. 5, 2017

(54) POWER CONVERTER

(71) Applicant: TOSHIBA TEC KABUSHIKI KAISHA, Shinagawa-ku, Tokyo (JP)

(72) Inventor: Yutaka Usami, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 14/816,258

(22) Filed: Aug. 3, 2015

(65) Prior Publication Data

US 2016/0043648 A1 Feb. 11, 2016

(30) Foreign Application Priority Data

Aug. 7, 2014 (JP) .................................. 2014-161785

(51) Int. Cl.
| | |
|---|---|
| *H02M 1/12* | (2006.01) |
| *H02M 1/42* | (2007.01) |
| *H02M 3/335* | (2006.01) |
| *H02M 7/217* | (2006.01) |
| *H02M 7/219* | (2006.01) |

(Continued)

(52) U.S. Cl.
CPC ............ *H02M 1/4258* (2013.01); *H02M 1/12* (2013.01); *H02M 3/33507* (2013.01); *H02M 7/12* (2013.01); *H02M 7/217* (2013.01); *H02M 7/219* (2013.01); *H02M 2001/0009* (2013.01); *H02M 2001/0058* (2013.01); *Y02B 70/126* (2013.01); *Y02B 70/1491* (2013.01)

(58) Field of Classification Search
CPC .... H02J 4/00; H02M 1/4258; H02M 3/33569; H02M 7/797; H02M 2001/009; H02M 1/12; H02M 3/24; H02M 3/22; H02M 3/325; H02M 3/335; H02M 3/28; H02M 3/338; H02M 3/3381; H02M 3/3385; Y02B 70/126; Y02B 70/149; Y02B 70/1491
USPC ..................................................... 363/15–19
See application file for complete search history.

(56) References Cited

U.S. PATENT DOCUMENTS

| | | | | |
|---|---|---|---|---|
| 2012/0092909 | A1* | 4/2012 | Usami ................... | H02M 7/217 363/80 |
| 2012/0307529 | A1* | 12/2012 | Chiba .................... | H02M 1/08 363/17 |

(Continued)

FOREIGN PATENT DOCUMENTS

| | | |
|---|---|---|
| JP | 2011-147277 | 7/2011 |
| JP | 2014-007879 | 1/2014 |

(Continued)

*Primary Examiner* — Harry Behm
*Assistant Examiner* — Bryan R Perez
(74) *Attorney, Agent, or Firm* — Amin, Turocy & Watson LLP

(57) ABSTRACT

A power converter consists of a power conversion circuit for converting alternating power into insulated direct power and a control unit. The control unit, based on a voltage of alternating voltage power supply and a circuital current flowing through the power conversion circuit, supplies pulse signals for alternatively opening or closing a group consisting of a first and a fourth switch and a group consisting of a second switch and a third switch to the two groups. Through the switching action, a current composed of the low-frequency component of an alternating voltage power supply mixed with the high-frequency component of a switch flows to the power converter.

7 Claims, 16 Drawing Sheets

(51) Int. Cl.
　　　*H02M 7/12*　　　(2006.01)
　　　*H02M 1/00*　　　(2006.01)

(56) References Cited

U.S. PATENT DOCUMENTS

2013/0194698 A1* 8/2013 Sase .................... H02M 1/4258
　　　　　　　　　　　　　　　　　　　　　360/75
2015/0340871 A1* 11/2015 Usami ................. H02M 1/4258
　　　　　　　　　　　　　　　　　　　　　307/72

FOREIGN PATENT DOCUMENTS

| JP | 2014-039418 | 2/2014 |
| WO | 2014-073257 | 5/2014 |

* cited by examiner

POWER CONVERTER

CROSS-REFERENCE TO RELATED APPLICATION

This application is based upon and claims the benefit of priority from Japanese Patent Application No. 2014-161785, filed Aug. 7, 2014, the entire contents of which are incorporated herein by reference.

FIELD

Embodiments described herein relate to a power converter for converting an alternating voltage obtained from an alternating voltage power supply into a direct voltage and supplying power for a load.

BACKGROUND

There are known two general methods of converting an alternating voltage into a direct voltage. Method 1: full wave rectification is implemented on an alternating current from an alternating voltage power supply using a diode bridge circuit, and the direct current subjected to the full wave rectification is smoothed using a smoothing capacitor.

In method 1, generally, if an alternating voltage is positive or negative, the current flows through a series circuit composed of two diodes, resulting in a power loss which is equivalent to the product of the current flowing both the diodes and the forward voltage of the diodes.

Method 2: a power factor improvement converter (PFC) is configured between the diode bridge circuit and the smoothing capacitor used in method 1. The power factor improvement converter carries out a control to change the current flowing to the alternating voltage power supply into a sine-wave current and a control to equalize a sine-wave current to the voltage phase of the alternating voltage power supply.

In method 2, the current also flows through a series circuit composed of two diodes during a full wave rectification process, thus causing a power loss. Moreover, a current alternatively flows through a Field Effect Transistor (FET) which constitutes the power factor improvement converter and the diodes, leading to a further loss.

Further, apart from being required to change the waveform of an input current into a sine wave, the power factor improvement converter is also required to set an output voltage to be higher than the input voltage. However, the voltage needed by a load is not definitely higher than the input voltage. In this case, a buck converter is connected with and located at the rear side of the power factor improvement converter so that the voltage stepped up by the power factor improvement converter is reduced to a desired voltage. A loss is caused by the voltage reduction. A whole power converter consists of three sections: an AC-DC converter, a DC-DC (step-up) converter and a DC-DC (step-down) converter, and the power conversion efficiency of the power converter is presented as the product of the conversion efficiencies of the three sections. For example, if the efficiency of each section is 0.95, then the product of the three sections is: 0.95*0.95*0.95=0.86. In other words, even if each section achieves an outstanding efficiency of up to 95%, the whole conversion efficiency drops to 86%. Thus, a power converter, if composed of a plurality of sections, is obviously reduced in conversion efficiency even if the conversion efficiency of each section is remarkable.

At present, in addition to the requirement on being more power-saving, no current harmonic noises for external environment becomes another necessary requirement on electronic machines. Thus, it is needed to improve the conversion efficiency of a power converter which supplies the power to a load and endow the power converter with a current harmonic suppression function.

DETAILED DESCRIPTION

In accordance with an embodiment, a power converter comprises a power conversion circuit and a control unit.

The power conversion circuit connects a first switch with a second switch in series while connecting a third switch with a fourth switch in series. The power conversion circuit separately connects the first switch with the third switch and the second switch with the fourth switch and connects a second capacitor with two ends of the third and the fourth switch. The power conversion circuit connects a series circuit composed of a first capacitor and a second inductor with a series circuit composed of a third capacitor and the primary winding of a transformer in parallel between the connection point of the first and the second switch and the connection point of the third and the fourth switch. In the power conversion circuit, a first diode, a third inductor and a fourth capacitor are connected in series in a closed manner at one side of the secondary winding of the transformer, and a second diode, a fourth inductor and the fourth capacitor are connected in series in a closed manner at the other side of the secondary winding of the transformer. In the power conversion circuit, an alternating voltage power supply is connected with two ends of the first capacitor via the first inductor, and a load is connected with two ends of the fourth capacitor.

In order to make a current resulting from mixing the low-frequency component of the alternating voltage power supply with a high-frequency component flow through the power conversion circuit, the control unit supplies pulse signals for alternatively opening and closing a group consisting of the first and the fourth switch and a group consisting of the second and the third switch to the two groups based on an input voltage obtained by a unit for detecting a voltage input from the alternating voltage power supply, an output voltage obtained by a unit for detecting a voltage output to the load, a circuital current obtained by a unit for detecting a current flowing through the power conversion circuit and a smoothed voltage obtained by a unit for detecting the voltage of the second capacitor.

Embodiments of the power converter are described below with reference to accompanying drawings.

(First Embodiment)

First, the power converter 100 of the first embodiment is described.

Figure 1:
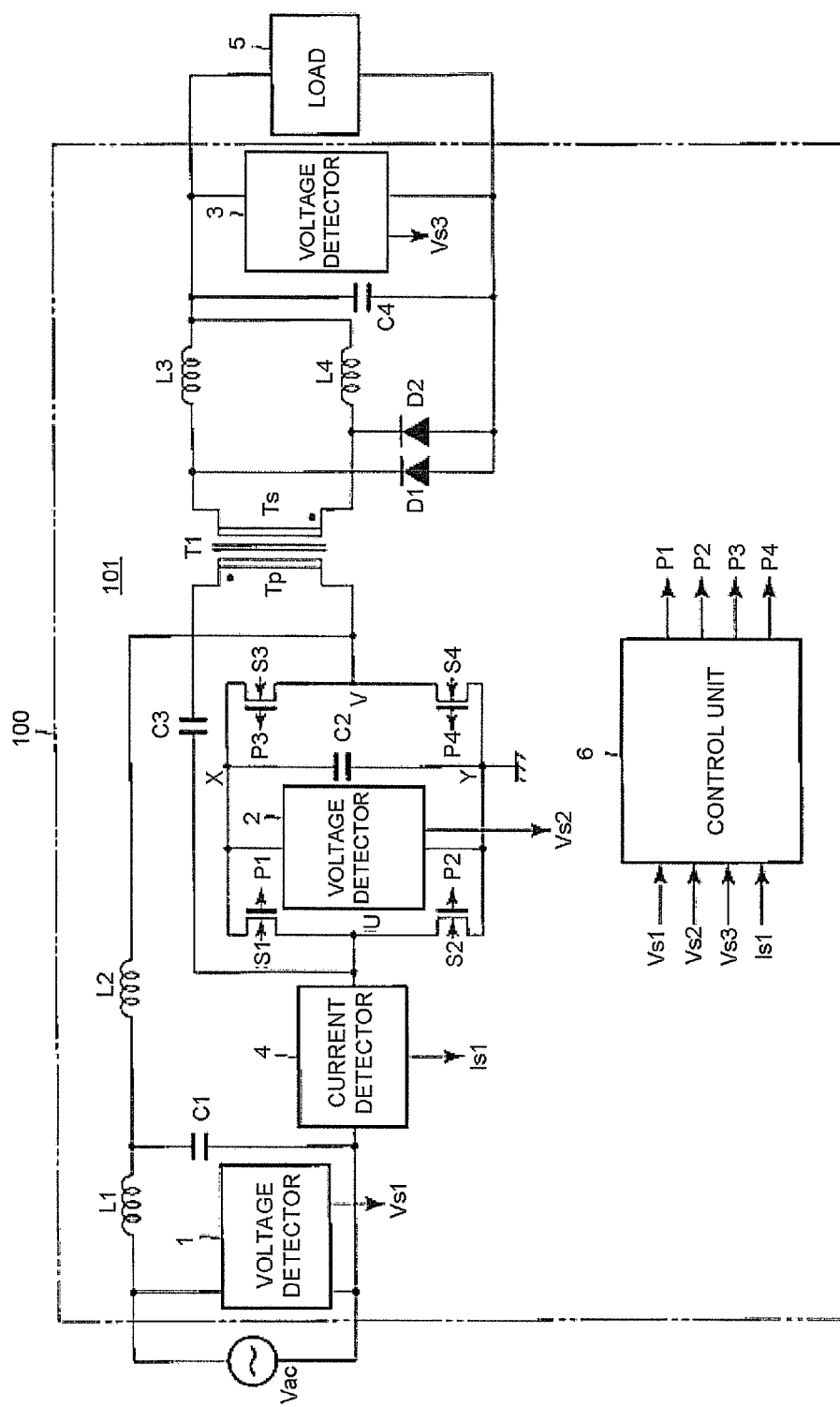
FIG. 1 is a diagram illustrating the circuit structure of a power converter according to a first embodiment.

FIG. 1 is a diagram illustrating the circuit structure of the power converter 100. The power converter 100 converts the power of an alternating voltage power supply Vac into an insulated direct voltage and outputs the direct voltage to a load 5.

The power converter 100 uses a power conversion circuit 101 which is composed of a first to a fourth semiconductor switch (hereinafter referred to as switch) S1, S2, S3 and S4, a first to a fourth inductor L1, L2, L3 and L4, a first to a fourth capacitor C1, C2, C3 and C4, an isolation transformer T1 and a first and a second diode D1 and D2. The switches S1-S4 are all N-type field effect transistors (MOSFETs). The switches S1-S4 may be GaN power devices or SiC power devices having the same characteristics with an MOSFET.

The power conversion circuit 101 connects the first to the fourth switch S1, S2, S3 and S4 in series to forma closed loop. Specifically, the power conversion circuit 101 connects the source terminal of the first switch S1 with the drain terminal of the second switch S2, the source terminal of the third switch S3 with the drain terminal of the fourth switch S4, the drain terminal of the first switch S1 with the drain terminal of the third switch S3 and the source terminal of the second switch S2 with the source terminal of the fourth switch S4.

Here, for the sake of convenient description, the node of the connection point of the first and the second switch S1 and S2 is named U terminal. The node of the connection point of the third and the fourth switch S3 and S4 is named V terminal. The node of the connection point of the first and the third switch S1 and S3 is named X terminal. The node of the connection point of the second and the fourth switch S2 and S4 is named Y terminal.

In the power conversion circuit 101, a second capacitor C2 is connected between the X terminal and the Y terminal. That is, in the power conversion circuit 101, the second capacitor C2 is connected at two ends of a series circuit composed of the first switch S1 and the second switch S2 or a series circuit composed of the third switch S3 and the fourth switch S4.

In the power conversion circuit 101, the first capacitor C1 is connected with the second inductor L2 in series between the U terminal and the V terminal. Further, in the power conversion circuit 101, the third capacitor C3 is connected with the primary winding Tp of the isolation transformer T1 in series between the U terminal and the V terminal. That is, in the power conversion circuit 101, the series circuit composed of the first capacitor C1 and the second inductor L2 is connected with the series circuit composed of the third capacitor C3 and the primary winding Tp in parallel between the U terminal and the V terminal.

In the power conversion circuit 101, the third inductor L3 is connected with the fourth inductor L4 in series at two ends of the secondary winding Ts of the isolation transformer T1. Further, in the power conversion circuit 101, the fourth capacitor C4 is connected with first diode D1 in series from the connection point of the third inductor L3 and the fourth inductor L4 to the connection point of the third inductor L3 and the secondary winding Ts. Moreover, in the power conversion circuit 101, the second diode D2 is connected from the connection point of the fourth capacitor C4 and the first diode D1 to the connection point of the fourth inductor L4 and the secondary winding Ts. That is, in the power conversion circuit 101, the first diode D1, the third inductor L3 and the fourth capacitor C4 are connected in series in a closed manner at one side of the secondary winding Ts of the isolation transformer T1. Further, in the power conversion circuit 101, the second diode D2, the fourth inductor L4 and the fourth capacitor C4 are connected in series in a closed manner at the other side of the secondary winding Ts.

In the power converter 100 provided with the power conversion circuit 101 with the foregoing structure, the two ends of the first capacitor C1 are connected with the alternating voltage power supply Vac via the first inductor L1. Further, in the power converter 100, the load 5 is connected with two ends of the fourth capacitor C4.

In the power converter 100, a first to a third voltage detector 1, 2 and 3 and a current detector 4 are arranged in the power conversion circuit 101. The first voltage detector 1 is connected with two ends of the series circuit composed of the first capacitor C1 and the first inductor L1. Through the connection, the first voltage detector 1 can detect the voltage between two terminals of the alternating voltage power supply Vac, that is, the voltage Vs1 input to the power conversion circuit 101.

The second voltage detector 2 is connected between the X terminal and the Y terminal, like the second capacitor C2. Through the connection, the second voltage detector 2 can detect the voltage between two ends of the second capacitor C2, in other words, a smoothed voltage Vs2.

The third voltage detector 3 connects the load 5 with two ends of the fourth capacitor C4 in parallel. Through the connection, the third voltage detector 3 can detect a voltage Vs3 output to the load 5.

The current detector 4 is connected between the connection point of the alternating voltage power supply Vac and the first capacitor C1 and the connection point between the U terminal and the third capacitor C3. Through the connection, the current detector 4 can detect the current flowing through the second inductor L2 as a circuital current Is1.

The power converter 100 comprises a control unit 6 for controlling the power conversion circuit 101. The control unit 6 converts the power of the alternating voltage power supply Vac into a direct voltage and controls the power conversion circuit 101 to output the direct voltage to the load 5.

The control unit 6 inputs signals corresponding to the voltages Vs1, Vs2 and Vs3 detected by the first to the third voltage detector 1, 2 and 3 and a signal corresponding to the current Is1 detected by the current detector 4. The control unit 6 generates gate drive signals P1, P2, P3 and P4 of the first to the fourth switch S1, S2, S3 and S4 based on the input signals and outputs the gate drive signal P1 to the gate terminal of the first switch S1, the gate drive signal P2 to the gate terminal of the second switch S2, the gate drive signal P3 to the gate terminal of the third switch S3 and the gate drive signal P4 to the gate terminal of the fourth switch S4.

The first to the fourth switch S1, S2, S3 and S4 are all switched off during the period in which the gate terminals thereof are not supplied with the gate drive signals P1, P2, P3 and P4 and switched on when the gate terminals thereof are supplied with the gate drive signals. Through the on/off action, the first to the fourth switch S1, S2, S3 and S4 are repeatedly switched on and off. Through the switching action, the power converter 100 can obtain a high-frequency current of, for example, 100 kHz (Kilohertz).

In the embodiment, it is assumed that a commercial power supply the voltage of which is 100V (volts) and the frequency of which is 50 Hz (hertz) serves as the alternating voltage power supply Vac and the load 5 is supplied with a power of 200 W (watts). In this case, as the alternating voltage is 100V, to obtain a power of 200 W, a current of 2 A (amperes) is needed. In other words, if the current flowing through the first inductor L1 to the alternating voltage power supply Vac is 2 A, then the power converter 100 can supply a power of 200 W to the load 5.

In the power conversion circuit 101, the series circuit composed of the first inductor L1 and the first capacitor C1 constitutes a low pass filter. Thus, when a commercial power supply serves as the alternating voltage power supply Vac, the current flowing to the side of the alternating voltage power supply Vac through the first inductor L1 is merely a current consisting of a 50 Hz low-frequency component.

In this state, the power conversion circuit 101 generates a 100 kHz high-frequency current by switching on/off the first to the fourth switch S1, S2, S3 and S4. At this time, a 100 kHz high-frequency component is contained in the current flowing through the first capacitor C1 to the first switch S1 or the second switch S2. The current flowing to the first switch S1 or the second switch S2 also flows to opposite third switch S3 and fourth switch S4. Thus, in the current detector 4, a current composed of the 50 Hz low-frequency component and the 100 kHz high-frequency component can be detected as the circuital current Is1 of the power conversion circuit 101.

On the other hand, the current flowing to the first S1 or the second switch S2 also flows to the third capacitor C3. Then, the low-frequency component of the current is cut off by the third capacitor C3. Thus, the current flowing to the primary winding Tp of the isolation transformer T1 becomes a current merely composed of a 100 kHz high-frequency component. In other words, a 100 kHz high-frequency current is generated by the power conversion circuit 101 so that the current flowing to the primary winding Tp of the isolation transformer T1 becomes a current merely composed of a 100 kHz high-frequency component.

For example, the 100 kHz high-frequency current is obtained by alternatively opening and closing a switch pair consisting of the first switch S1 and the fourth switch S4 and a switch pair consisting of the second switch S2 and the third switch S3. To alternatively switch the switch pair consisting of the first switch S1 and the fourth switch S4 and the switch pair consisting of the second switch S2 and the third switch S3, the envelopes of the peaks of the specific circuital current Is1 constitute a sine wave. Then, the envelopes become an envelope pair consisting of a plus current side envelope env1 and a minus current side envelope env2. The power converter 100 alternatively switches on/off the switch pair consisting of the switches S1 and S4 and the switch pair consisting of the switches S2 and S3 at proper time so as to switch the orientation of a current between the envelope pair consisting of the plus current side envelope env1 and the minus current side envelope env2. Through the switching action, the power conversion circuit 101 generates a 100 kHz high-frequency current.

Figure 2:
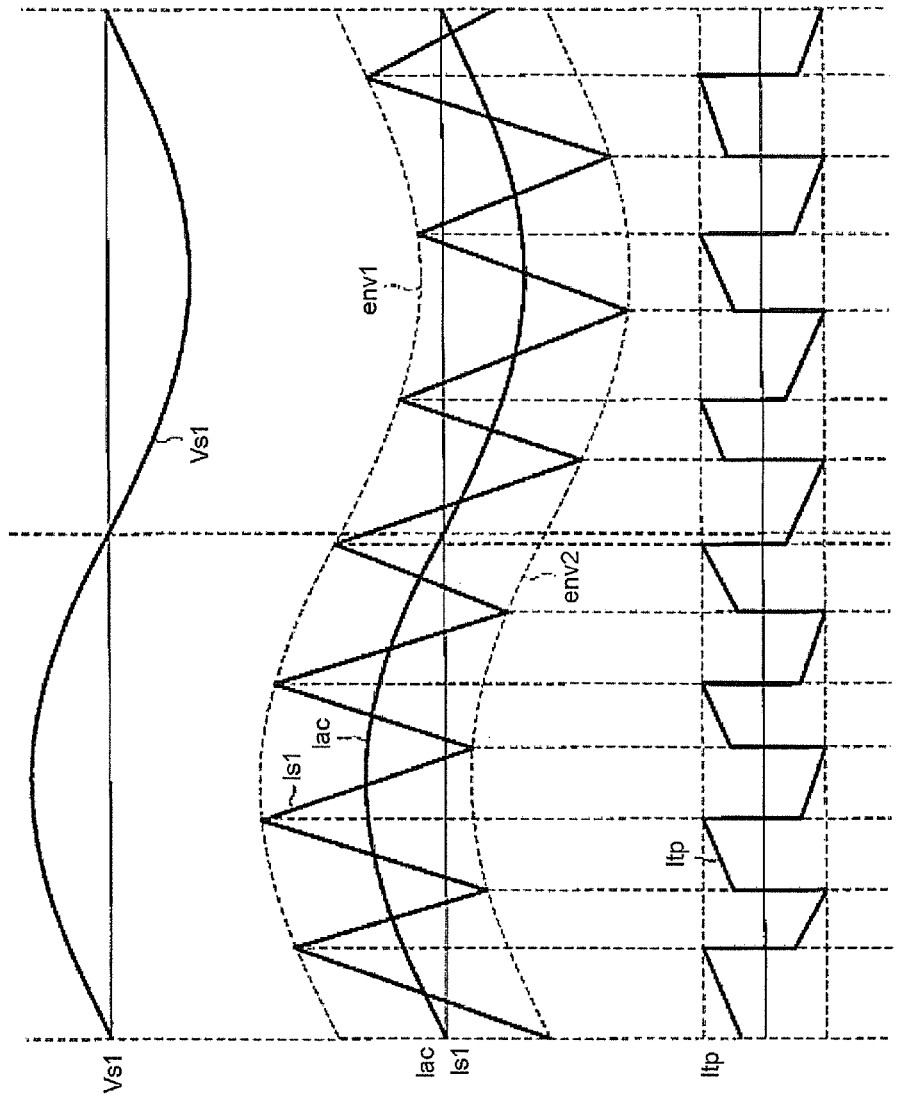
FIG. 2 is a waveform diagram illustrating the switchback of a circuital current between envelopes according to the first embodiment.

The switchback of the circuital current Is1 between the two envelopes env1 and env2 is described below in detail with reference to the waveform diagram shown in FIG. 2. FIG. 2 shows the voltage (input voltage) Vs1 of the alternating voltage power supply Vac, the envelope pair consisting of the plus current side envelope env1 and the minus current side envelope env2; the circuital current Is1, a low-frequency component current Iac extracted from the circuital current Is1 and a current Itp flowing through the primary winding Tp of an isolation transformer T1.

The current Iac is equal to an input current flowing to the alternating voltage power supply Vac. To enable the power converter 100 to supply a desired power for the load 5, the value of the input current Iac is a target value.

It is assumed that the circuital current Is1 is substantially linearly increased or decreased repeatedly when the circuital current Is1 switchbacks between the envelope pair consisting of the plus current side envelope env1 and the minus current side envelope env2 to activate the power conversion circuit 101. At this time, the average of the circuital current Is1 is represented by the midpoint of the envelopes env1 and env2. The waveform formed by connecting the midpoints is accordant with that of the input current Iac. Thus, by taking the target input current Iac as the center, a pair of plus current side envelope env1 and minus current side envelope env2 are set at equal width positions, without making a complicated calculation.

On the other hand, the current Itp in a trapezoidal waveform but not a triangular waveform flows to the primary winding Tp of the isolation transformer T1 because of the arrangement of the third and the fourth inductor L3 and L4 on the secondary winding Ts of the isolation transformer T1. For example, when a positive voltage is applied to one side of the secondary winding Ts which is connected with the third inductor L3, the current flowing through the third inductor L3 is gradually increased because of the voltage. In this case, the other side of the secondary winding Ts which is connected with the fourth inductor L4 becomes a negative potential. Thus, in the power conversion circuit 101, current flows out from the minus current side of circuital output via the second diode D2. Charges are accumulated in the fourth capacitor C4 through the current.

On the contrary, when a positive voltage is applied to the other side of the secondary winding Ts which is connected with the fourth inductor L4, the current flowing through the fourth inductor L4 is gradually increased because of the voltage. In this case, one side of the secondary winding Ts which is connected with the third inductor L3 becomes a negative potential. Thus, in the power conversion circuit 101, current flows out from the minus current side of circuital output via the first diode D1. Charges are accumulated in the fourth capacitor C4 through the current.

Thus, no matter the secondary winding Ts of the isolation transformer T1 is applied with a positive voltage or a negative voltage, current always flows to the third inductor L3 or the fourth inductor L4, and charges are accumulated in the fourth capacitor C4. As a result, the current Itp flowing through the primary winding Tp of the isolation transformer T1 is a trapezoidal waveform but not a triangular waveform.

In the first embodiment, a commercial power supply the voltage of which is 100V and the frequency of which is 50 Hz serves as the alternating voltage power supply Vac. In this case, the pair of plus current side envelope env1 and minus current side envelope env2 becomes a sine waveform the frequency of which is 50 Hz. The input current Iac is determined by the amplitude of the sine wave. In other words, the power converter 100 is capable of controlling the input current Iac through the amplitudes of the envelopes env1 and env2.

The input voltage Vs1 is 100V, unchanged. The input power is the product of the input voltage Vs1 and the input current Iac. Thus, the input power changes with the input current Iac. Here, if it is assumed that the output power (e.g. 200 W) supplied to the load 5 is unchanged, then the energy corresponding to the change of the input power is accumulated in the second capacitor C2 as charges. That is, when the input power is greater than the output power, the smoothed voltage Vs2 boosts. That is, when the input power is smaller than the output power, the smoothed voltage Vs2 drops.

On the other hand, the current Itp flowing to the primary winding Tp of the isolation transformer T1 can be increased or decreased to change the output power. The distance between the pair of plus current side envelope env1 and minus current side envelope env2 is changeable so that the current Itp can be increased or decreased. For example, the distance between the pair of plus current side envelope env1 and minus current side envelope env2 is narrowed to decrease the output power. In this way, the circuital current Is1 switchbacks as a small current, thus reducing the current Itp. If the current Itp is decreased, then the voltage generated in the secondary winding Ts of the isolation transformer T1 is decreased. As a result, the current flowing through the third and the fourth inductor L3 and L4 is decreased to decrease the power output to the load 5.

Contrarily, the distance between the pair of plus current side envelope env1 and minus current side envelope env2 is widened to increase the output power. In this way, the circuital current Is1 switchbacks as a large current, thus increasing the current Itp. If the current Itp is increased, then the voltage generated in the secondary winding Ts of the isolation transformer T1 is increased. As a result, the current flowing through the third and the fourth inductor L3 and L4 is increased to increase the power output to the load 5.

Thus, the power converter 100 varies the amplitudes of the envelopes env1 and env2 while fixing the voltage of the second capacitor C2, thereby adjusting input power. Further, by varying the width between the envelopes env1 and env2 while fixing the voltage generated in the secondary winding Ts of the isolation transformer T1, the output power can be adjusted. Thus, the power converter 100 can adjust the power at an input side and the power at an output side by controlling the envelopes env1 and env2.

The control unit 6 implements the foregoing control as stated above.

Figure 3:
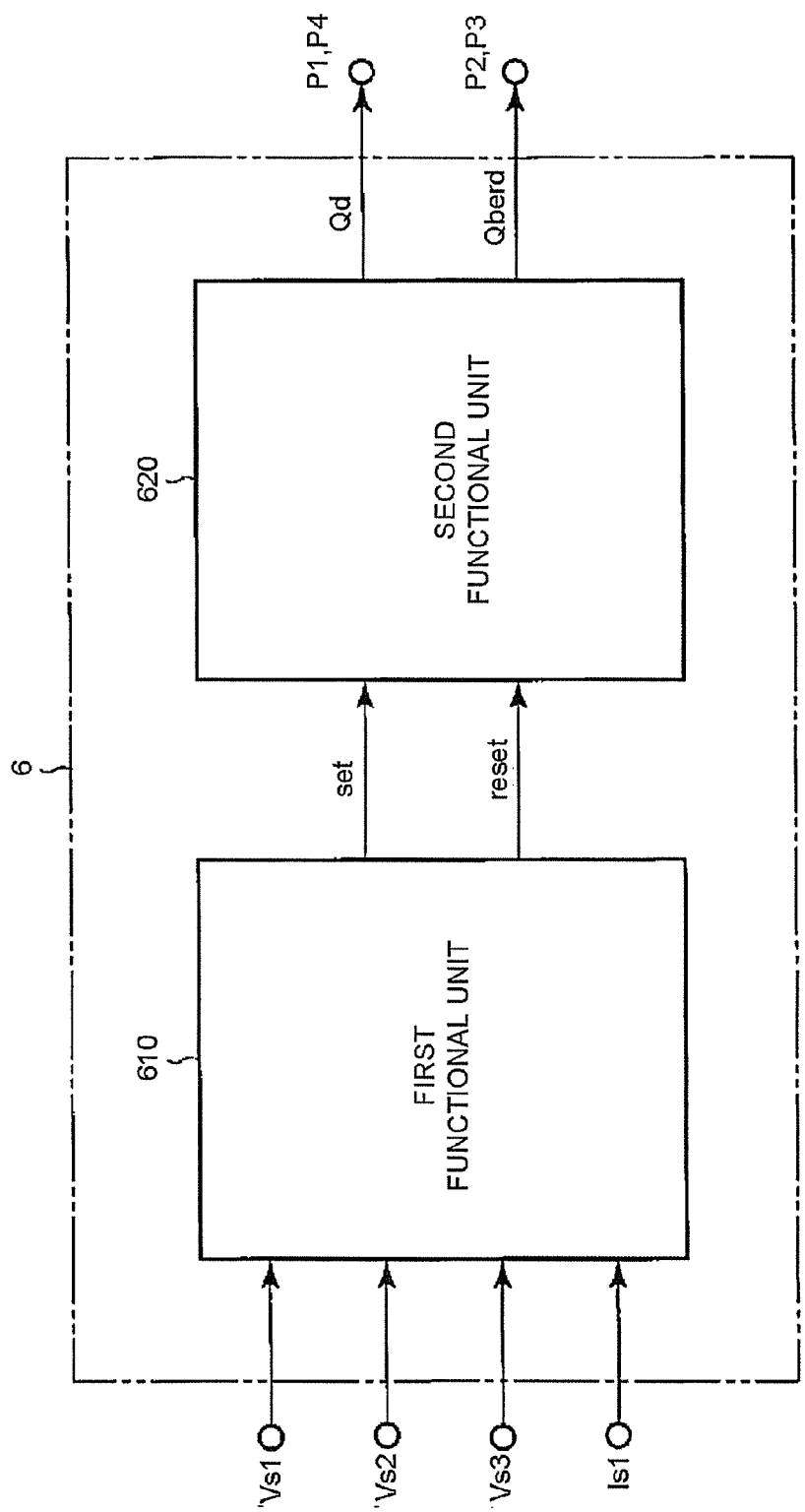
FIG. 3 is a block diagram illustrating the general structure of a control unit according to the first embodiment.

FIG. 3 is a block diagram illustrating the general structure of the control unit 6. The control unit 6 consists of a first functional section 610 and a second functional section 620.

The first functional section 610 has an envelope generation function, a circuital current determination function and a determination result output function. That is, the first functional section 610 takes the voltage Vs1 input to the power conversion circuit 101, the smoothed voltage Vs2 of the second capacitor C2, a voltage Vs3 output to the load 5 and the circuital current Is1 as an input. Then, the first functional section 610 generates the pair of plus current side envelope env1 and minus current side envelope env2 using the input voltage Vs1, the smoothed voltage Vs2 and the output voltage Vs3. The first functional section 610 determines whether or not the circuital current Is1 reaches the value of the envelopes env1 and env2 and outputs a set pulse signal 'set' or a reset pulse signal 'reset' according to the result of the determination.

The second functional section 620 has a function of generating gate drive signals P1-P4 corresponding to the first to the fourth switch S1-S4. That is, the second functional section 620 inputs the set pulse signal 'set' and the reset pulse signal 'reset' from the first functional section 610. Then, the second functional section 620 generates a pulse signal Qd and a pulse signal Qbard using the set pulse signal 'set' and the reset pulse signal 'reset'. The second functional section 620 outputs the pulse signal Qd as gate drive signals P1 and P4 of the first and the fourth switch S1 and S4 and the pulse signal Qbard as gate drive signals P2 and P3 of the second and the third switch S2 and S3.

Figure 4:
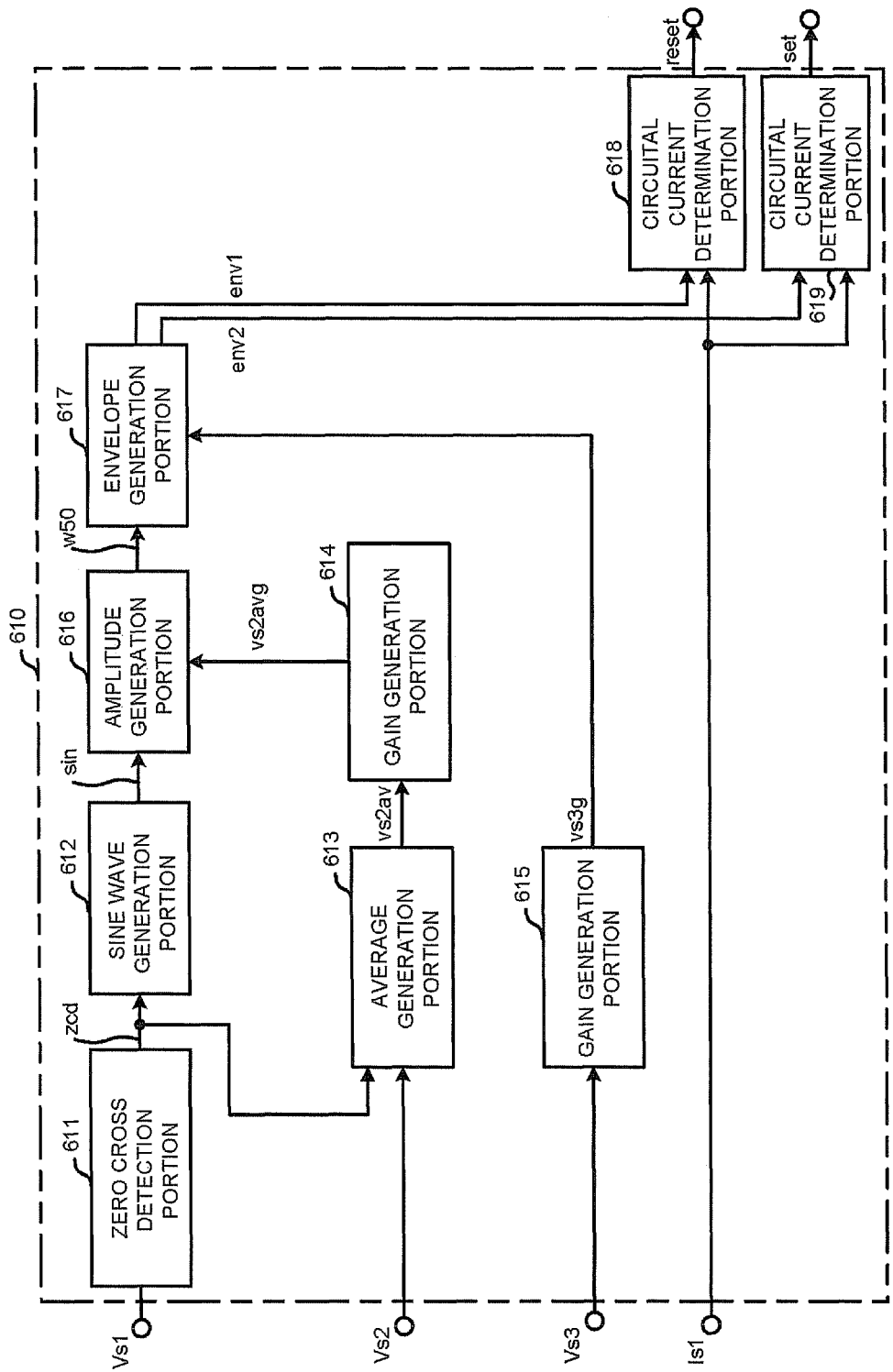
FIG. 4 is a block diagram illustrating the detailed structure of a first functional section according to the first embodiment.

FIG. 4 is a block diagram illustrating the detailed structure of the first functional section 610. The first functional section 610 comprises: a zero cross detection portion 611, a sine wave generation portion 612, an average generation portion 613, a first gain generation portion 614, a second gain generation portion 615, an amplitude generation portion 616, an envelope generation portion 617, a first circuital current determination portion 618 and a second circuital current determination portion 619.

The zero cross detection portion 611 takes detection signal of an input voltage Vs1 as an input and a zero cross signal zcd as an output. The level of the zero cross signal zcd becomes 'H' when the polarity of the input voltage Vs1 is switched from negative to positive and 'L' when the polarity of the input voltage Vs1 is switched from positive to negative.

The sine wave generation portion 612 takes the zero cross signal zcd as an input. The sine wave generation portion 612 outputs a sine wave signal 'sin' (sine wave generation unit) in synchronization with zero cross, that is, in synchronization with the time when the level of the zero cross signal zcd is switched from 'H' to 'L' or from 'L' to 'H'.

The average generation portion 613 takes detection signal of a smoothed voltage Vs2 and the zero cross signal zcd as an input and calculates and outputs the average vs2av of the smoothed voltage Vs2 in a cycle in synchronization with the zero cross signal zcd.

The first gain generation portion 614 takes the average vs2av of the smoothed voltage Vs2 as an input. The first gain generation portion 614 sets the amplification factor vs2avg of the current Iac flowing to the alternating voltage power supply Vac by setting the average vs2av as a specific voltage and outputs the set amplification factor. The amplification factor vs2avg is set to be small if the average vs2av is higher than the specific voltage and set to be large if the average vs2av is smaller than the specific voltage.

The second gain generation portion 615 takes a detection signal of output voltage Vs3 as an input. The second gain generation portion 615 sets an amplification factor vs3g by setting the output average Vs3 as a specific voltage and outputs the set amplification factor. The amplification factor vs3g is set to be small if the average Vs3 is higher than the specific voltage and set to be large if the average Vs3 is smaller than the specific voltage.

The amplitude generation portion 616 takes the sine wave signal 'sin' and the amplification factor vs2avg as an input. The amplitude generation portion 616 generates an amplitude signal w50 by multiplying the phase of the sine wave signal 'sin' by the amplification factor vs2avg and outputs the amplitude signal w50. The amplitude signal w50 the frequency of which is 50 Hz is changed in amplitude with the amplification factor vs2avg.

The envelope generation portion 617 takes the amplitude signal w50 and the amplification factor vs3g as an input. The envelope generation portion 617 generates the pair of a plus current side envelope env1 and a minus current side envelope env2 according to the amplitude signal w50 and the amplification factor vs3g and outputs the pair of envelopes (envelope generation unit). The plus current side envelope env1 is a signal resulting from adding the amplification factor vs3g to the amplitude signal w50. The minus current side envelope env2 is a signal resulting from deducting the amplification factor vs3g from the amplitude signal w50. Thus, the width between the plus current side envelope env1 and the minus current side envelope env2 varies with the amplification factor vs3g.

The first circuital current determination portion 618 takes the plus current side envelope env1 and a detection signal of the circuital current Is1 as an input and the reset pulse signal 'reset' as an output and outputs the reset pulse signal 'reset' when the circuital current Is1 is beyond the plus current side envelope env1 (determination unit).

The second circuital current determination portion 619 takes the minus current side envelope env2 and a detection signal of the circuital current Is1 as an input and the set pulse signal 'set' as an output and outputs the set pulse signal 'set' when the detection signal of the circuital current Is1 is lower than the minus current side envelope env2 (determination unit).

Figure 5:
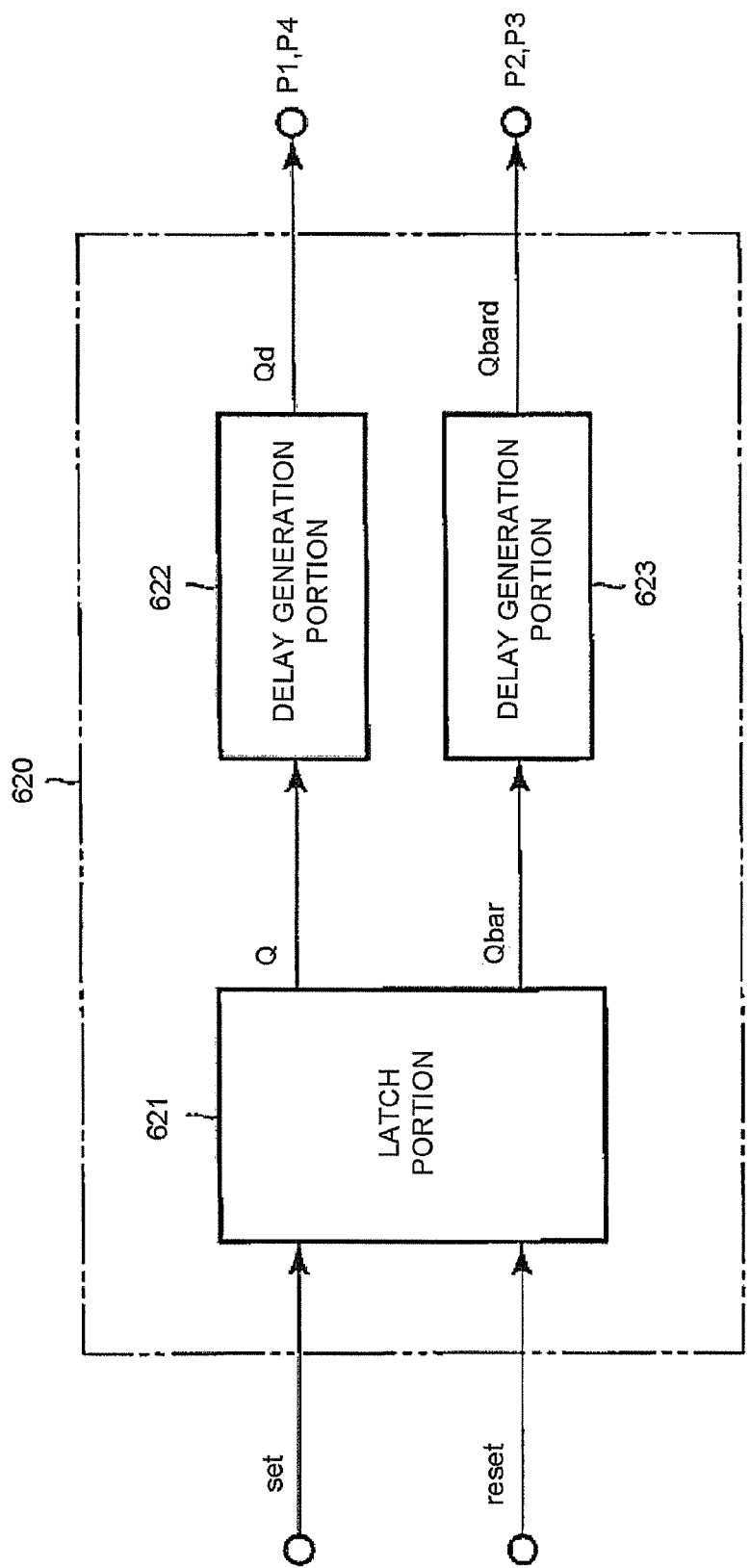
FIG. 5 is a block diagram illustrating the detailed structure of a second functional section according to the first embodiment.

FIG. 5 is a block diagram illustrating the detailed structure of the second functional section 620. The second functional section 620 comprises a latch portion 621, a first delay generation portion 622 and a second delay generation portion 623.

The latch portion 621 takes the set pulse signal 'set' and the reset pulse signal 'reset' as an input and a positive logic signal Q and an opposite logic signal Qber as an output. If the set pulse signal 'set' is input, then the latch portion 621 takes the positive logic signal Q as high level 'H' and keeps the state until the next input. If the reset pulse signal 'reset' is input, then the latch portion 621 takes the opposite logic signal Qber as high level 'H' and keeps the state until the next input.

The first delay generation portion 622 takes the positive logic signal Q of the latch portion 621 as an input. The first delay generation portion 622 adds a specific delay time d1 to the positive logic signal Q. Then, the first delay generation portion 622 takes the positive logic signal Qd added with the delay time d1 as gate drive signals P1 and P4 corresponding to the first switch S1 and the fourth switch S4 and outputs the gate drive signals P1 and P4 (pulse generation unit).

The second delay generation portion 623 takes the opposite logic signal Qber of the latch portion 621 as an input. The second delay generation portion 623 adds the opposite logic signal Qber with a specific delay time d2. Then, the second delay generation portion 623 takes the opposite logic signal Qberd added with the delay time d2 as gate drive signals P2 and P3 corresponding to the second switch S2 and the third switch S3 and outputs the gate drive signals P2 and P3 (pulse generation unit).

Figure 6:
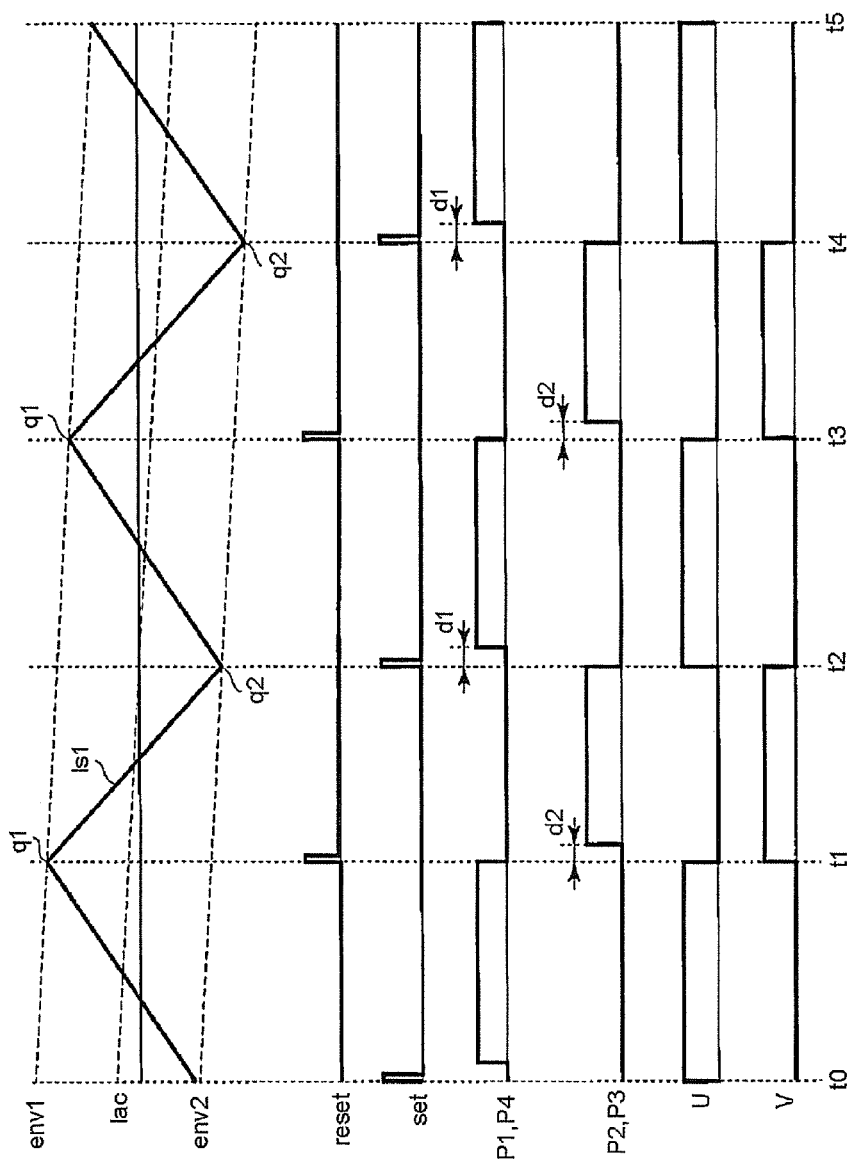
FIG. 6 is a waveform diagram illustrating the actions of a first and a second functional section according to the first embodiment.

The actions of the first and the second functional section 610 and 620 are described with reference to the waveform diagram shown in FIG. 6. FIG. 6 shows the input current Iac, the circuital current Is1, the reset pulse signal 'reset', the set pulse signal 'set', gate drive signals P1-P4 corresponding to the first to the fourth switch S1-S4 and voltages applied to the U terminal and the V terminal.

In FIG. 6, the circuital current Is1 reaches the minus current side envelope env2 at time point t0, t2 and t4 (a minus current side arrival point q2). On the other hand, the circuital current Is1 reaches the plus current side envelope env1 at time point t1, t3 and t5 (a plus current side arrival point q1).

The circuital current Is1 reaches the plus current side envelope env1, and then the reset pulse signal 'reset' is output through the first circuital current determination portion 618. In this way, the opposite logic signal Qber becomes high in level in the latch portion 621, and the positive logic signal Q becomes low in level.

Correspondingly, the gate drive signals P1 and P4 corresponding to the first switch S1 and the fourth switch S4 become low in level 'L'. Further, after being added with the delay time d2 by the second delay generation portion 623, the gate drive signals P2 and P3 become high in level 'H'.

The first switch S1 and the fourth switch S4 are switched off when the gate drive signals P1 and P4 become low in level 'L'. The second switch S2 and the third switch S3 are switched on when the gate drive signals P2 and P3 become high in level 'H'. After the first switch S1 and the fourth switch S4 are switched off, the voltage of the U terminal is of zero level, and the voltage of the V terminal becomes the voltage accumulated in the second capacitor C2.

When the circuital current Is1 reaches the minus current side envelope env2, the set signal 'set' is output through the circuital current determination portion 619. In this way, in the latch portion 621, the positive logic signal Q becomes high in level, and the opposite logic signal Qber becomes low in level. Correspondingly, the gate drive signals P2 and P3 corresponding to the second switch S2 and the third switch S3 become low in level 'L'. Further, after being added with the delay time d1 by the first delay generation portion 622, the gate drive signals P1 and P4 become high in level 'H'.

The second switch S2 and the third switch S3 are switched off when the gate drive signals P2 and P3 become low in level 'L'. The first switch S1 and the fourth switch S4 are switched on when the gate drive signals P1 and P4 become high in level 'H'. After the second switch S2 and the third switch S3 are switched off, the voltage of the V terminal is of zero level, and the voltage of the U terminal becomes the voltage accumulated in the second capacitor C2.

Further, the gate drive signals P1-P4 all become low in level 'L' during periods d1 and d2. However, during these periods, a loop current flows to the switches S1-S4. Thus, the voltages of the U terminal and the V terminal are determined during the period in which the switches S1-S4 are switched off before delay time d1 and delay time d2 are generated.

In this manner, a state in which the voltage of each of the U terminal and the V terminal is of zero level and a state in which the voltage of each of the U terminal and the V terminal is applied with the voltage of the second capacitor C2 alternatively occur. Herein, the primary winding Tp of the isolation transformer T1 is connected between the U terminal and the V terminal through the third capacitor C3.

Thus, a high-frequency alternating current flows to the primary winding Tp of the isolation transformer T1 in synchronization with the arrival of the circuital current Is1 at the pair of plus current side envelope env1 and minus current side envelope env2. As a result, the power converter 100 converts the power of the alternating voltage power supply Vac into a direct voltage different from an insulated direct voltage and supplies power to a load 5 through the direct voltage (Second Embodiment)

Sequentially, a power converter 200 of the second embodiment is described. The power converter 200 of the second embodiment is different from the power converter 100 of first embodiment in the first functional section 610 of the control unit 6. The power conversion circuit 101 and the second functional section 620 of the control unit 6, which are identical to those of the power converter 100, are not described here repeatedly.

As stated in the first embodiment, the power converter 100 is capable of increasing an input power by widening the amplitudes of the pair of plus current side envelope env1 and minus current side envelope env2 and decreasing an output power by reducing the width between the pair of plus current side envelope env1 and minus current side envelope env2. Thus, to transitionally increase input power or decrease output power, the amplitudes of the envelopes env1 and env2 are increased or the width between the envelopes env1 and env2 is reduced. At this time, the pair of envelopes env1 and env2 is deflected to the plus current side or minus current side. Generally, the pair of envelopes env1 and env2 must exist at the plus current side and the minus current side.

The power converter 200 of the second embodiment prevents the pair of envelopes env1 and env2 from being deflected to the plus current side or the minus current side together.

Figure 7:
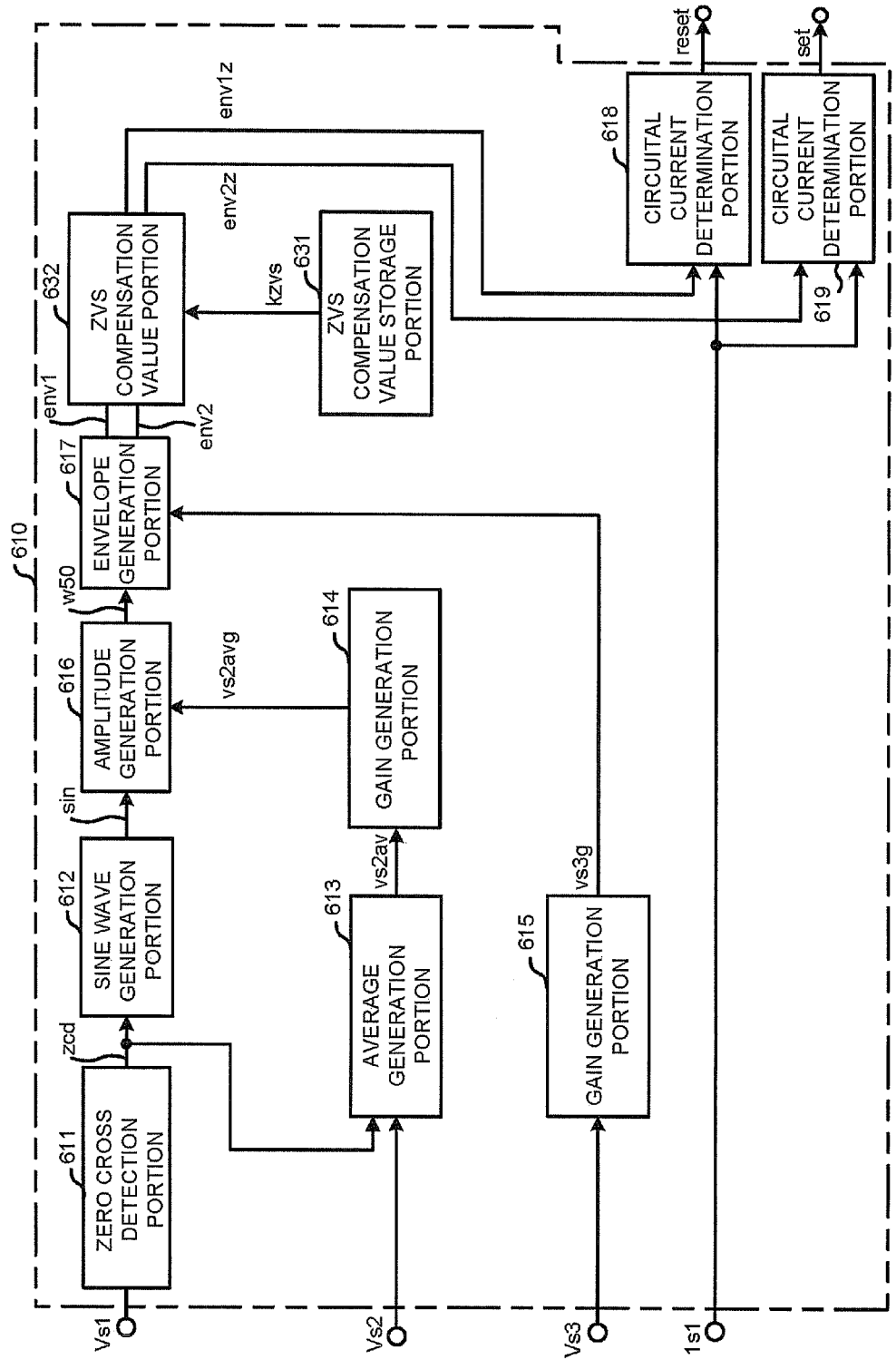
FIG. 7 is a block diagram illustrating the detailed structure of a first functional section according to a second embodiment.

FIG. 7 is a block diagram specifically illustrating the structure of the first functional section 630 of the control unit 6 in the power converter 200. Further, in FIG. 4 and FIG. 7, identical parts are denoted by identical signs.

In addition to an envelope generation function, a circuital current determination function and a determination result output function, the first functional section 630 also has an envelope correction function based on ZVS (Zero Voltage Switching) compensation. That is, on the basis of the first functional section 610, the first functional section 630 further includes a ZVS compensation value storage portion 631 and a ZVS compensation portion 632.

The storage portion 631 stores a threshold value kzvs for ZVS compensation. The threshold value kzvs is assigned to the ZVS compensation portion 632.

The ZVS compensation portion 632 takes the pair of plus current side envelope env1 and minus current side envelope env2 generated by the envelope generation portion 617 as an input. Then, in order to prevent the absolute value of the plus current side envelope env1 from being below the threshold value kzvs for ZVS compensation, the ZVS compensation portion 632 corrects the plus current side envelope env1 (correction unit). The ZVS compensation unit 632 outputs a signal representing the corrected a plus current side envelope env1z to the first circuital current determination portion 618.

In order to prevent the absolute value of the minus current side envelope env2 from being beyond the threshold value kzvs for ZVS compensation, the ZVS compensation portion 632 corrects the minus current side envelope env2 (correction unit). The ZVS compensation unit 632 outputs a signal representing the corrected minus current side envelope env2z to the second circuital current determination portion 619.

The first circuital current determination portion 618 takes the signal representing the corrected plus current side envelope env1 and a detection signal for the circuital current Is1 as an input and the reset pulse signal 'reset' as an output. When the circuital current Is1 is beyond the corrected plus current side envelope env1z, the first circuital current determination portion 618 outputs the reset pulse signal 'reset'.

The second circuital current determination portion 619 takes the signal representing the corrected minus current side envelope env2 and a detection signal for the circuital current Is1 as an input and the set pulse signal 'set' as an output. When the circuital current Is1 is below the corrected minus current side envelope env2z, the second circuital current determination portion 619 outputs the set pulse signal 'set'.

Figure 8:
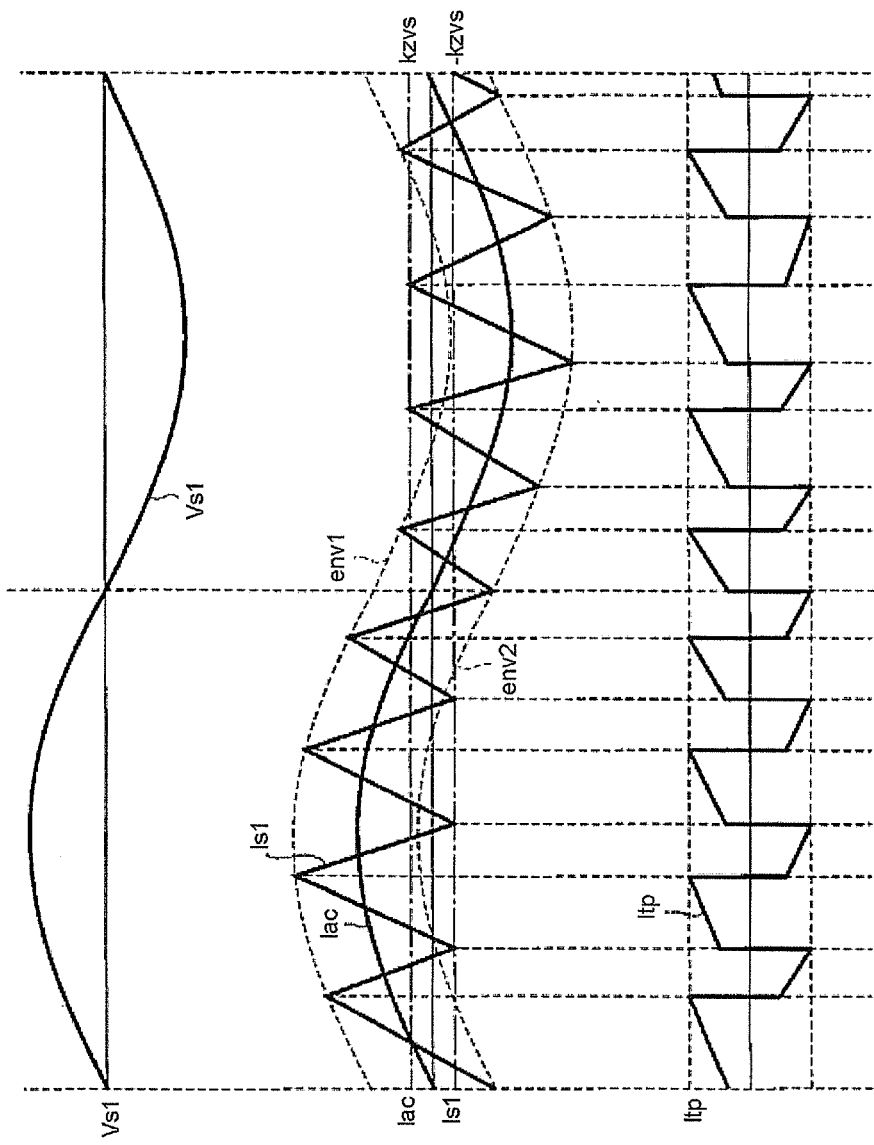
FIG. 8 is a waveform diagram illustrating the switchback of a circuital current between envelopes according to the second embodiment.

FIG. 8 shows the input voltage Vs1, the pair of plus current side envelope env1 and minus current side envelope env2, the circuital current Is1, a plus current side threshold value kzvs and a minus current side threshold value −kzvs for ZVS compensation, a low-frequency component current Iac extracted from the circuital current Is1 and a current Itp passing through the primary winding Tp of an isolation transformer T1.

As shown in FIG. 8, the plus current side envelope env1 is preferred in the area above the plus current side compensation value kzvs. That is, the orientation of the circuital current Is1 is switched at the time point the circuital current Is1 reaches the plus current side envelope env1. The plus current side threshold value kzvs is preferred in the area below the plus current side compensation value kzvs. That is, the orientation of the circuital current Is1 is switched at the time point the circuital current Is1 reaches the plus current side compensation value kzvs.

Likewise, the minus current side envelope env2 is preferred in the area below the minus current side compensation value −kzvs. That is, the orientation of the circuital current Is1 is switched at the time point the circuital current Is1 reaches the minus current side envelope env2. The minus current side compensation value −kzvs is preferred in the area above the minus current side compensation value −kzvs. That is, the orientation of the circuital current Is1 is switched at the time point the circuital current Is1 reaches the minus current side compensation value −kzvs.

Thus, in the power converter 200, the circuital current Is1 is definitely a positive value, then a negative value and then a positive value, being a positive value and a negative value alternatively and switchbacking. Thus, in the first to the fourth switch P1-P4 using M O S F E T, a current undoubtedly flows through the body diodes of the MOSFETs when the switches P1-P4 are switched on. The voltage between the drain electrode and the source electrode of the MOSFET is zero during the period when the current flows through the body diode of the MOSFET. At this time, as the MOSFET can be turned on, the power converter 200 can minimize the switching loss of the first to the fourth switch P1-P4.

Further, because of the application of ZVS compensation, the waveform of the input current tends to slant from sine wave. Thus, the setting of the threshold value kzvs for ZVS compensation is beneficial to guaranteeing operation safety and high-efficient operations in a range in which the waveform is not slanted extremely.

(Third Embodiment)

Then, a power converter 300 of the third embodiment is described. The power converter 300 of the third embodiment is different from the power converter 100 of the first embodiment in the connection position of the current detector 4 in the power conversion circuit 101. The other parts of the power conversion circuit 101 and the control unit 6, which are identical to those of the power converter 100, are not described here repeatedly.

Figure 9:
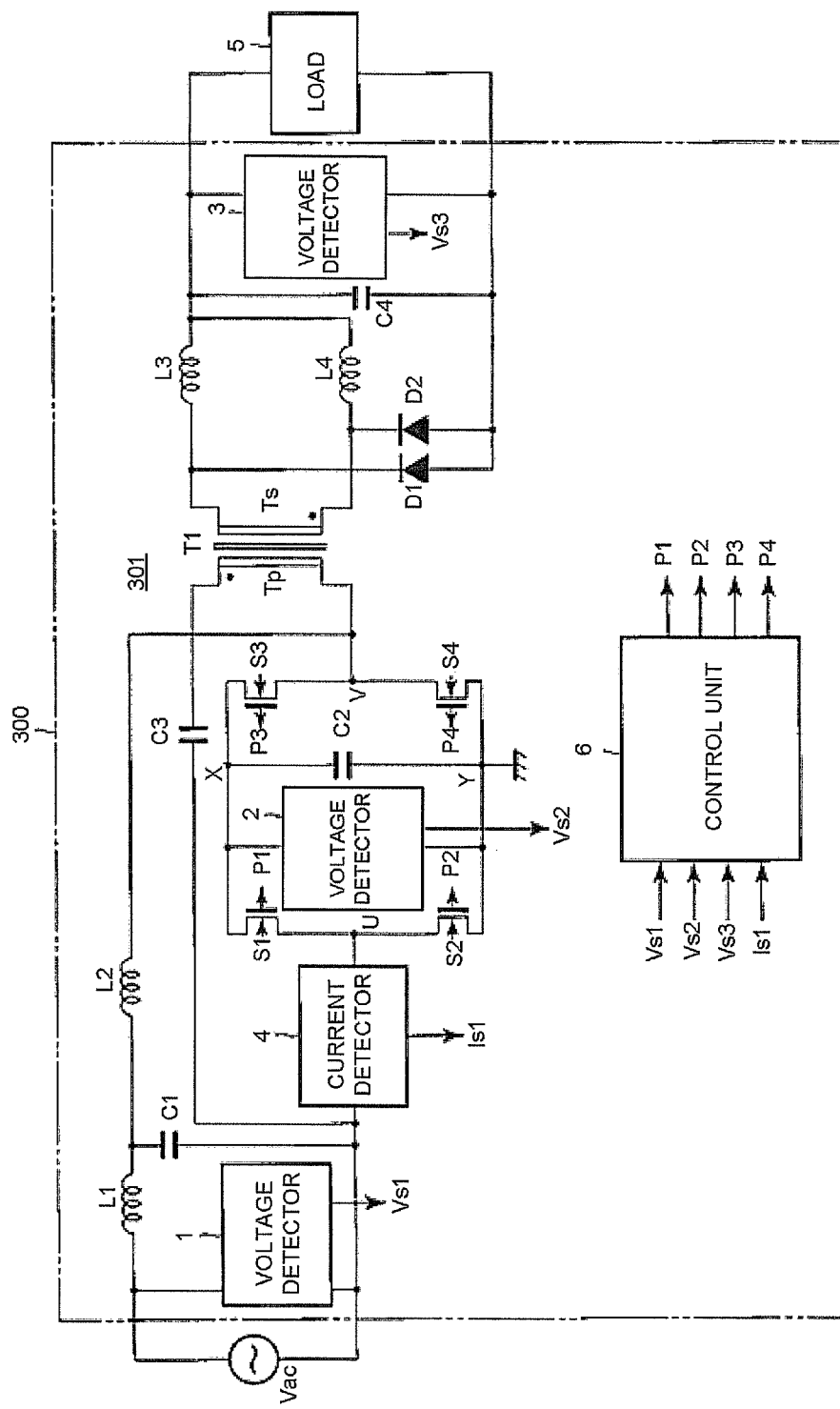
FIG. 9 is a diagram illustrating the circuit structure of a power converter according to a third embodiment.

FIG. 9 is a diagram illustrating the circuit structure of the power converter 300. In the power converter 300, the current detector 4 is connected between the connection point of the alternating voltage power supply Vac and the first capacitor C1 and the U terminal. Then, in the power converter 300, one end of the third capacitor C3 is connected between the current detector 4 and the connection point of the alternating voltage power supply Vac and the first capacitor C1, and the other end of the third capacitor C3 is connected with the primary winding Tp of the isolation transformer T1.

In this way, in the power converter 300, the current detector 4 is set at the position where the sum of the current flowing through the second inductor L2 and the current flowing through the third capacitor C3 can be detected. That is, the current detector 4 detects the sum of the current flowing through the second inductor L2 and the current flowing through the third capacitor C3 as a circuital current Is1.

Figure 10:
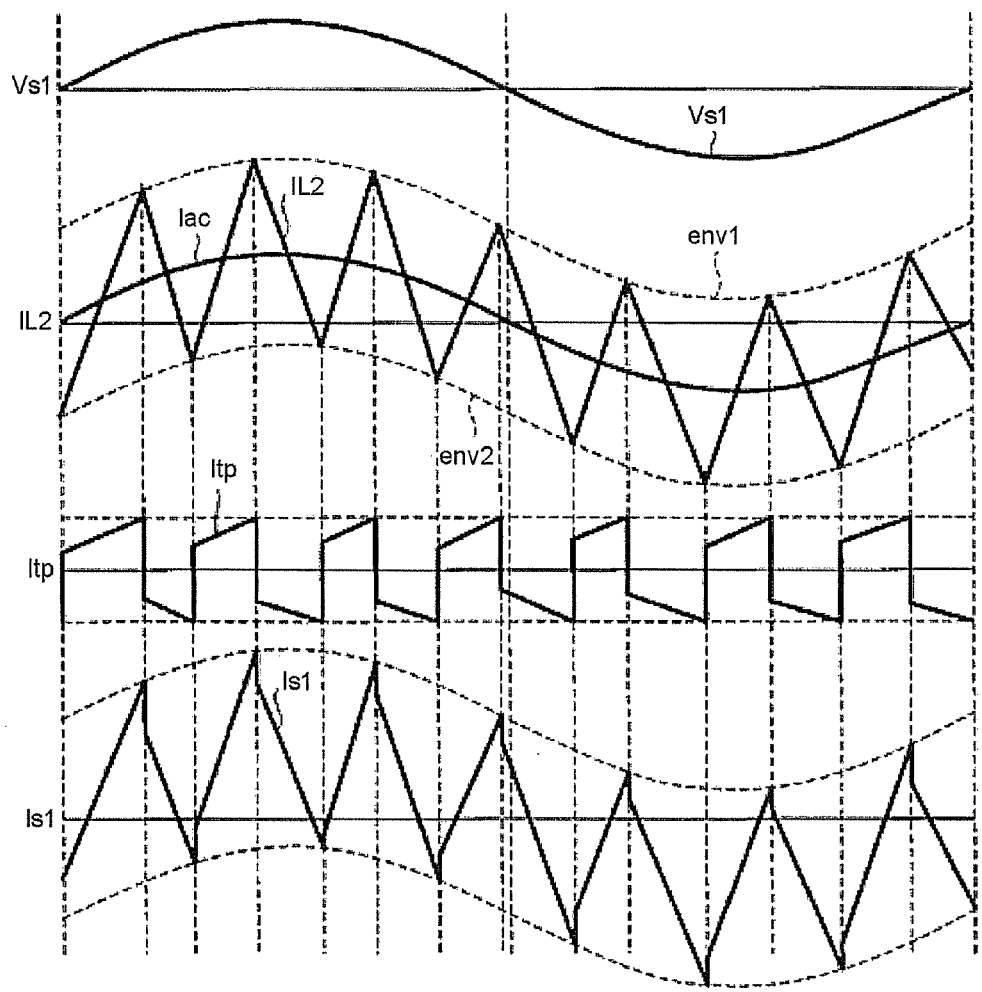
FIG. 10 is a waveform diagram illustrating the switchback of a circuital current between envelopes according to the third embodiment.
Figure 11:
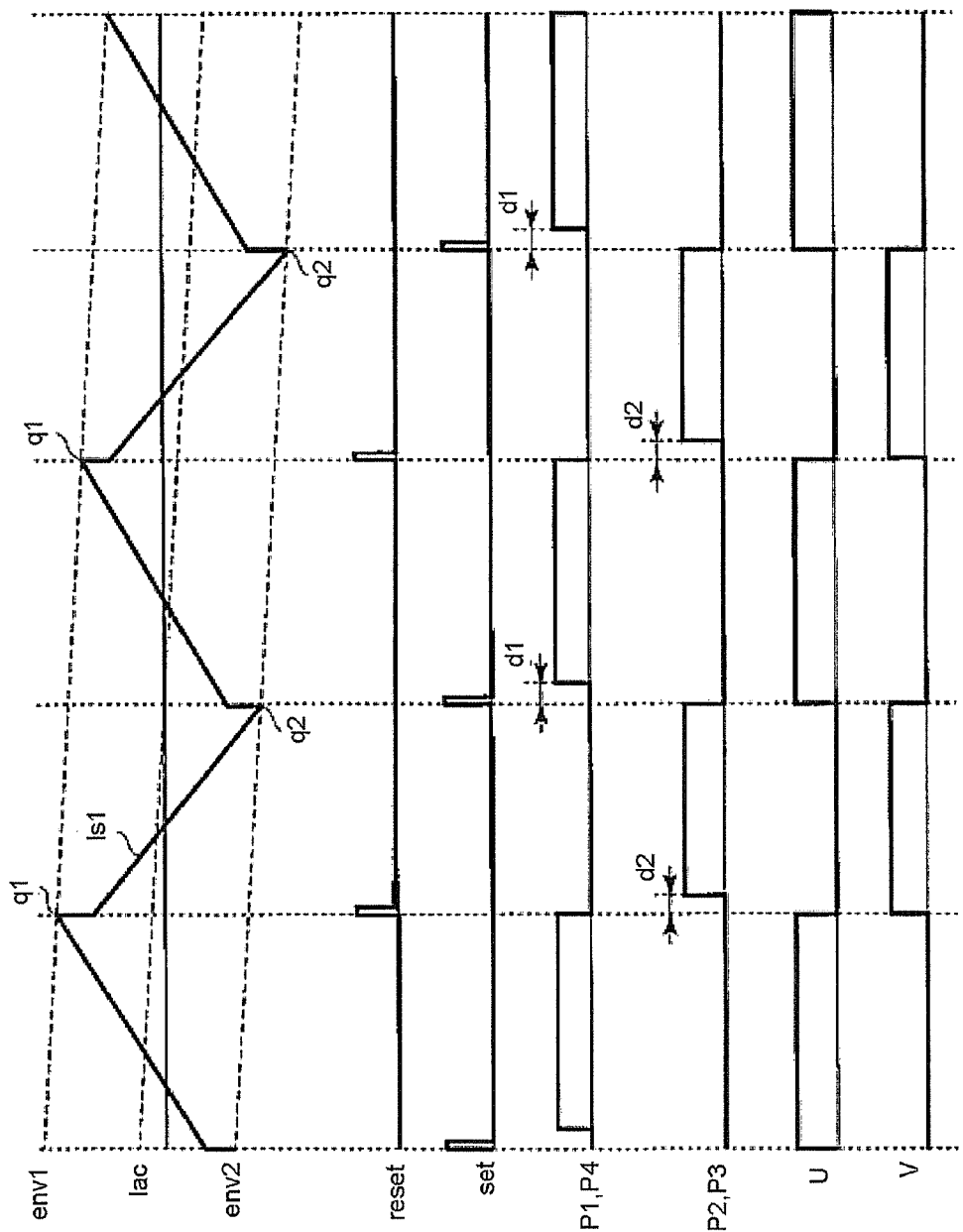
FIG. 11 is a waveform diagram illustrating the actions of a first and a second functional section according to the third embodiment.

FIG. 10 and FIG. 11 are waveform diagrams illustrating main signals for activating the power converter 300. FIG. 10 shows the voltage (input voltage) Vs1 of the alternating voltage power supply Vac, the pair of plus current side envelope env1 and minus current side envelope env2, a current IL2 flowing through the second inductor L2, a current Itp flowing through the primary winding Tp of the isolation transformer T1 and the circuital current Is1. FIG. 11 shows the input current Iac, the circuital current Is1, the reset pulse signal 'reset', the set pulse signal 'set', gate drive signals P1-P4 corresponding to the first to the fourth switch S1-S4 and voltages applied to the U terminal and the V terminal.

The basic actions of the power converter 300 are identical to those of the power converter 100. However, the waveform of the circuital current Is1 is different. That is, in the power converter 300, as the current IL2 flowing through the second inductor L2 and the current flowing through the third capacitor C3, that is, the current Itp flowing through the primary winding Tp of the isolation transformer T1, together constitute the circuital current Is1, the waveform of the circuital current Is1 is a triangular wave and a trapezoidal wave combined.

Even being such a current, the circuital current Is1 is controlled so that the circuital current Is1 reciprocates between the pair of plus current side envelope env1 and minus current side envelope env2, thus, the current Iac flowing to the alternating voltage power supply Vac is a sine wave current. The power supplied to the load 5 can be adjusted at the same time.

Further, the power converter 100 of the first embodiment can make the waveform of the input current Iac resemble a sine wave. Thus, an input current Iac having few harmonic components can be generated. However, on the other hand, considering the effect of the current Itp flowing through the primary winding Tp of the isolation transformer T1, the total number of circuital current needed to be relatively large so as to maintain a stable switching action.

On the other hand, the power converter 300 of the third embodiment further compares the circuital current Is1 which containing the current Itp with the pair of plus current side envelope env1 and minus current side envelope env2. Thus, the effect of the current Itp is slightly reflected in the waveform of the input current Iac, and the harmonic component of the input current Iac is a little increased. However, as the effect of the current Itp is not taken into consideration, a stable switching action can be maintained even if the total number of circuital current Is1 is relatively small.

The less all circuital currents are, the higher the power conversion efficiency is. Thus, to choose which one of the power converter 100 and the power converter 300 is determined based on the percentage of harmonic components of the current and power conversion efficiency.

(Fourth Embodiment)

Then, a power converter 400 of the fourth embodiment is described. The power converter 400 causes the power converter 100 to implement a phase shift action. The phase shift action refers to an action of delaying the switching action of the group consisting of the switches P3 and P4 by a certain time with respect to the group consisting of switches P1 and P2. Through the delay, the potentials of the U terminal and the V terminal are equalized to generate an interval in which the gradient of the circuital current Is1 disappears temporarily.

Figure 12:
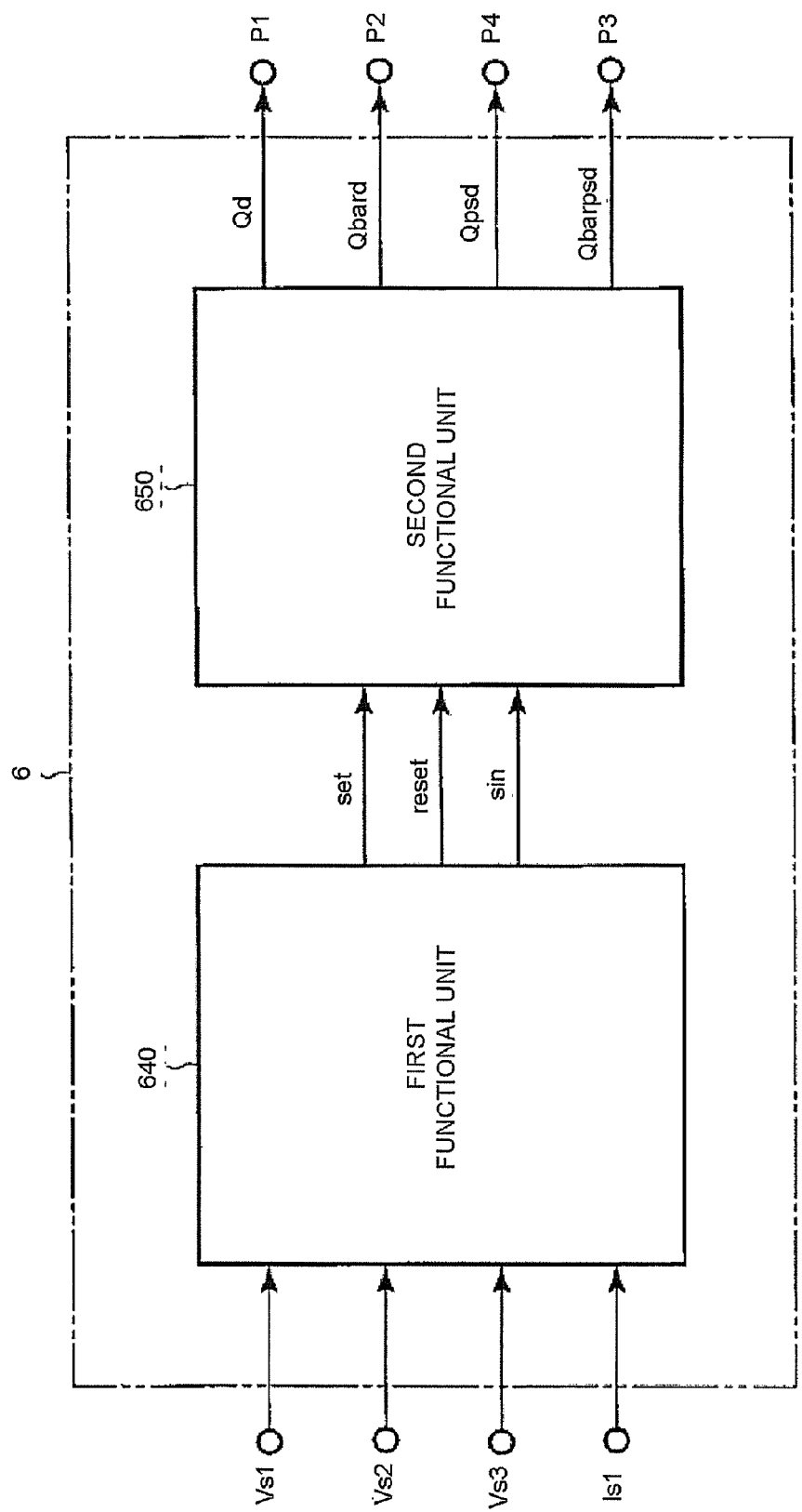
FIG. 12 is a block diagram illustrating the general structure of a control unit according to a fourth embodiment.

FIG. 12 is a block diagram illustrating the general structure of a control unit 6 in the power converter 400. Like the control unit 6 of the power converter 100, the control unit 6 of the power converter 400 consists of a first functional section 640 and a second functional section 650.

The first functional section 640 is different from the first functional section 610 of the first embodiment in outputting a sine wave signal 'sin' to the second functional section 650.

Figure 13:
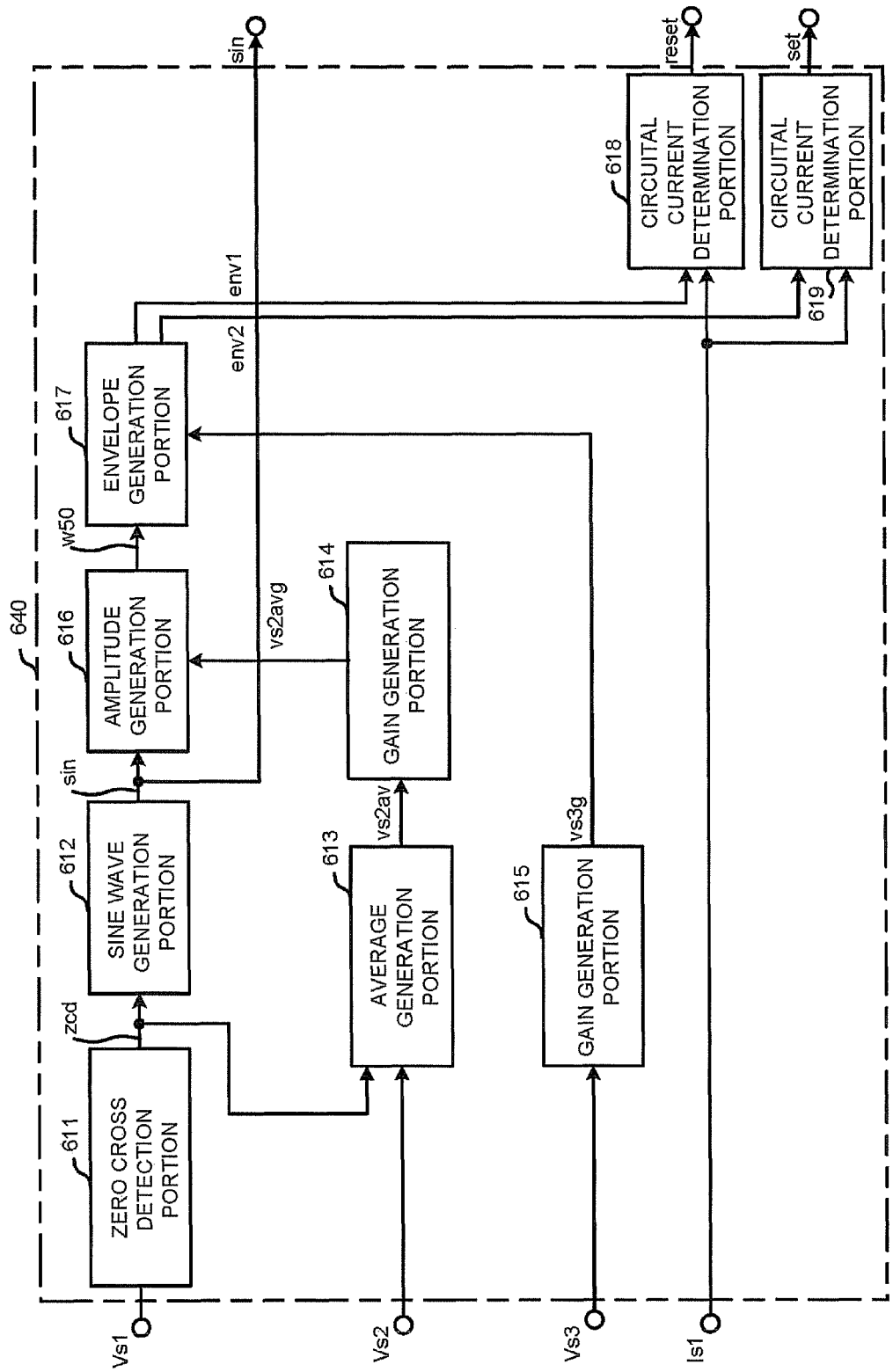
FIG. 13 is a block diagram illustrating the detailed structure of a first functional section according to the fourth embodiment.

FIG. 13 is a block diagram illustrating the detailed structure of the first functional section 640. As shown in FIG. 13, the first functional section 640 outputs the sine wave signal 'sin' generated by the sine wave generation portion 612 to the amplitude generation portion 616 while outputting the sine wave signal 'sin' to the second functional portion 650.

The second functional section 650 inputs the set pulse signal 'set', the reset pulse signal 'reset' and the sine wave signal 'sin' from the first functional section 640. The second functional section 650 generates a pulse signal Qd, a pulse signal Qbard, a pulse signal Qpsd and a pulse signal Qbarpsd using the set pulse signal 'set', the reset pulse signal 'reset' and the sine wave signal 'sin'. The second functional section 650 outputs the pulse signal Qd as the gate drive signal P1 of the first switch S1, the pulse signal Qbard as the gate drive signal P2 of the second switch S2, the pulse signal Qpsd as the gate drive signal P4 of the fourth switch S4 and the pulse signal Qbardpsd as the gate drive signal P3 of the third switch S3.

Figure 14:
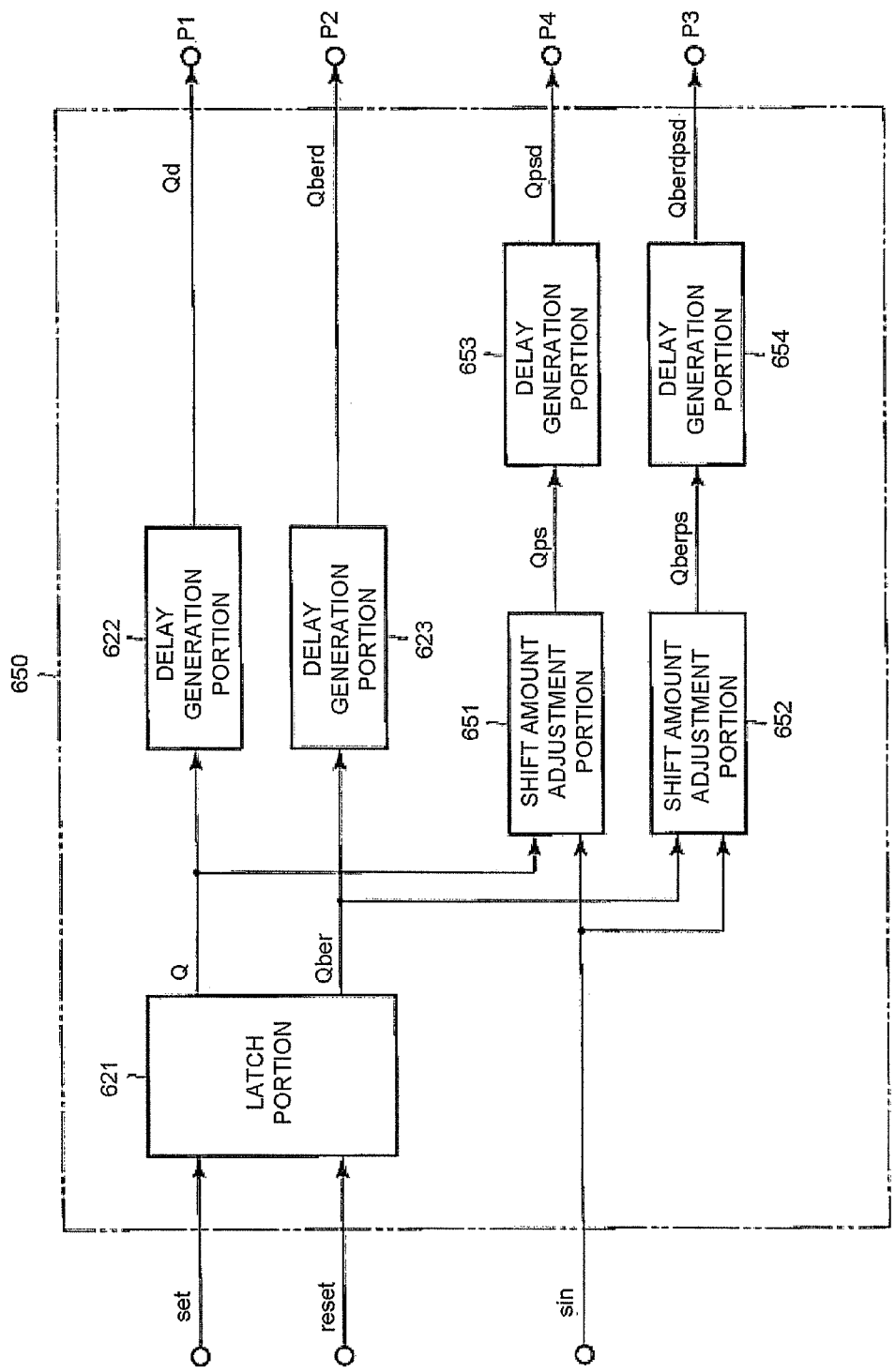
FIG. 14 is a block diagram illustrating the detailed structure of a second functional section according to the fourth embodiment.

FIG. 14 is a block diagram illustrating the detailed structure of the second functional section 650. As shown in FIG. 14, in addition to the latch portion 621, the first delay generation portion 622 and the second delay generation portion 623, the second functional section 650 also includes a first shift amount adjustment portion 651, a second shift amount adjustment portion 652, a third delay generation portion 653 and a fourth delay generation portion 654.

The first delay generation portion 622 outputs the positive logic signal Qd added with the delay time d1 as the gate drive signal P1 of the first switch S1.

The second delay generation portion 623 outputs the opposite logic signal Qberd added with the delay time d2 as the gate drive signal P2 of the second switch S2.

The first shift amount adjustment portion 651 takes the positive logic signal Q of the latch portion 621 and the sine wave signal 'sin' as an input. The first shift amount adjustment portion 651 calculates a shift amount corresponding to the sine wave signal 'sin' for the positive logic signal Q.

Then, the first shift amount adjustment portion 651 takes the delayed positive logic signal Qps added with the shift amount as an output.

The second shift amount adjustment portion 652 takes the opposite logic signal Qber of the latch portion 621 and the sine wave signal 'sin' as an input, calculates a shift amount corresponding to the sine wave signal 'sin' for the opposite logic signal Qber and then takes the delayed opposite logic signal Qberps added with the shift amount as an output.

The third delay generation portion 653 takes the positive logic signal Ops from the first shift amount adjustment portion 651 as an input, adds the positive logic signal Qps with a specific delay time d3 and outputs the positive logic signal Qpsd added with the delay time d3 as a gate drive signal P4 corresponding to the fourth switch S4.

The fourth delay generation portion 654 takes the opposite logic signal Qberps from the second shift amount adjustment portion 652 as an input, adds the opposite logic signal Qberps with a specific delay time d4 and then outputs the opposite logic signal Qberpsd added with the delay time d4 as a gate drive signal P3 corresponding to the third switch S3.

Figure 15:
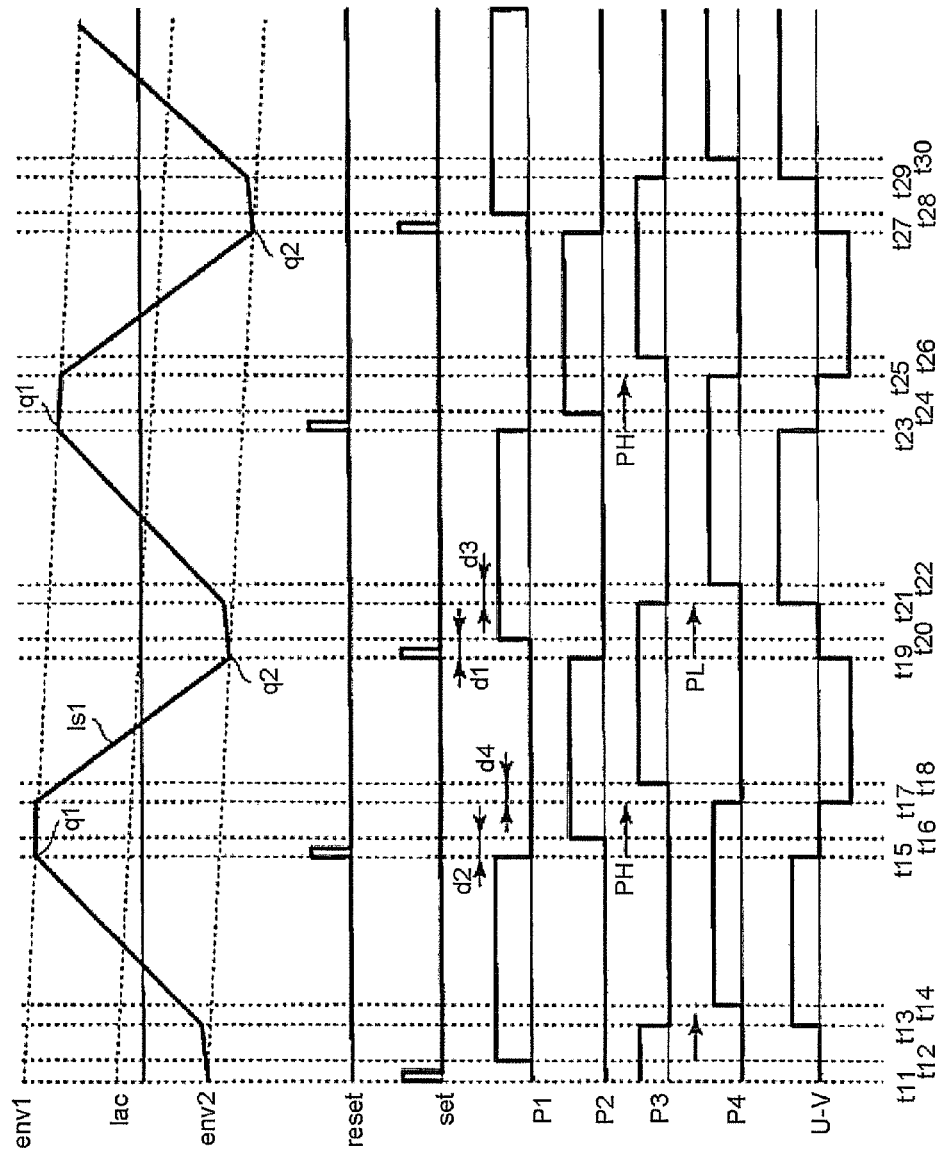
FIG. 15 is a waveform diagram illustrating the actions of a first and a second functional section according to the fourth embodiment.

The actions of the first and the second functional section 640 and 650 are described with reference to the waveform diagram shown in FIG. 15. FIG. 15 shows the input current Iac, the circuital current Is1, the reset pulse signal 'reset', the set pulse signal 'set', gate drive signals P1-P4 corresponding to the first to the fourth switch S1-S4 and the potential difference 'U–V' between the U terminal and the V terminal.

In FIG. 15, the circuital current Is1 reaches the minus current side envelope env2 at time points t11, t19 and t27 (a minus current side arrival point q2). On the other hand, the circuital current Is1 reaches the plus current side envelope env1 at time points t15 and t23 (a plus current side arrival point q1).

When the circuital current Is1 reaches the plus current side envelope env1, the reset pulse signal 'reset' is output by the first circuital current determination portion 618. In this way, the opposite logic signal Qber becomes high in level in the latch portion 621, and the positive logic signal Q becomes low in level. Correspondingly, the gate drive signal P1 corresponding to the first switch S1 becomes low in level 'L' (time points t15 and t23). Further, after being added with the delay time d2 generated by the second delay generation portion 623, the gate drive signal P2 becomes high in level 'H' (time points t16 and t24).

Further, a shift amount PH corresponding to the sine wave signal 'sin' is calculated for the positive logic signal Q and the opposite logic signal Qber in the shift amount adjustment portions 651 and 652. Then, the delayed positive logic signal Qps and opposite logic signal Qberps added with the shift amount PH are output. As a result, the gate drive signal P4 corresponding to the fourth switch S4 becomes low in level (L) (time points t17 and t25) merely by delaying time by the shift amount PH. Further, the gate drive signal P3 becomes high in level 'H' after a specific delay time d4 elapses from the time delay of the shift amount PH (time points t18 and t26).

If the circuital current Is1 reaches the minus current side envelope env2, then the set pulse signal 'set' is output by the circuital current determination portion 619. In this way, in the latch portion 621, the positive logic signal Q becomes high in level, and the opposite logic signal Qber becomes low in level. Correspondingly, the gate drive signal P2 corresponding to the second switch S2 becomes low in level 'L' (time points t11, t19 and t27). Further, after being added with the delay time d1 generated by the first delay generation portion 622, the gate drive signal P1 becomes high in level 'H' (time points t12, t20 and t28).

Further, a shift amount PL corresponding to the sine wave signal 'sin' is calculated for the positive logic signal Q and the opposite logic signal Qber. Then, the delayed positive logic signal Qps and opposite logic signal Qberps added with the shift amount PL are output. As a result, the gate drive signal P3 corresponding to the third switch S3 becomes low in level 'L' (time points t13, t21 and t29) merely by delaying time by the shift amount PL. Further, the gate drive signal P4 becomes high in level 'H' after a specific delay time d3 elapses from the time delay of the shift amount PL (time points t14, t22 and t30).

As the result of the action, the potential difference 'U–V' between the U point and the V point is a positive value in the interval in which the pulse signals P1 and P4 are both high in level 'H' and the pulse signals P2 and P3 are both low in level 'L'. Similarly, the potential difference 'U–V' between the U point and the V point is a negative value in the interval in which the pulse signals P1 and P4 are both low in level 'L' and the pulse signals P2 and P3 are both high in level 'H'. The potential difference 'U–V' is 0 in other intervals, specifically, the potential difference 'U–V' is 0 in the interval in which the pulse signal P4 is low in level 'L' after the pulse signal P1 becomes low in level 'L' and in the interval in which the pulse signal P3 is low in level 'L' after the pulse signal P2 becomes low in level 'L'.

The potential difference 'U–V' is applied to the second inductor L2 and the isolation transformer T1. As a result, the circuital current Is1 is increased when the potential difference 'U–V' is positive and decreased when the potential difference is negative and unchanged when the potential difference is 0.

The implementation of the phase shift action brings an advantage of supplying power for the load 5 without changing the frequency. In the absence of the phase shift action, the power supplied to the load 5 is controlled by adjusting the width between the two envelopes env1 and env2. Specifically, if the width between the envelopes env1 and env2 is narrowed, then the circuital current switchbacks as a small current, leading to an increase in frequency. If the frequency is increased, then the magnitude of the current supplied to the load 5 through the isolation transformer T1 is decreased, and the output power is decreased. Contrarily, if the width between the envelopes env1 and env2 is widened, then the switchbacking current is increased, leading to a reduction in frequency. If the frequency is reduced, then the magnitude of the current supplied to the load 5 through the isolation transformer T1 is increased, and the output power is increased. In the absence of the phase shift action, the change in the frequency hovers during the process of supplying power to the load 5. If depicted contrarily, an output control is unachievable if the frequency is unchanged.

Thus, during a phase shift period in which the phase shift action is carried out, the voltage between the U terminal and the V terminal is 0, thus, no current flows to the load 5 through the isolation transformer T1 during this period. That is, the output is decreased without changing the frequency.

(Fifth Embodiment)

A power converter 500 of the fifth embodiment is described. The power converter 500 causes the power converter 300 to implement a phase shift action. The power converter 500 which is structurally identical to the power converter 400 of the fourth embodiment carries out the same basic actions with the power converter 400. Thus, the description on the detailed structure and basic actions of the power converter 500 is saved.

Figure 16:
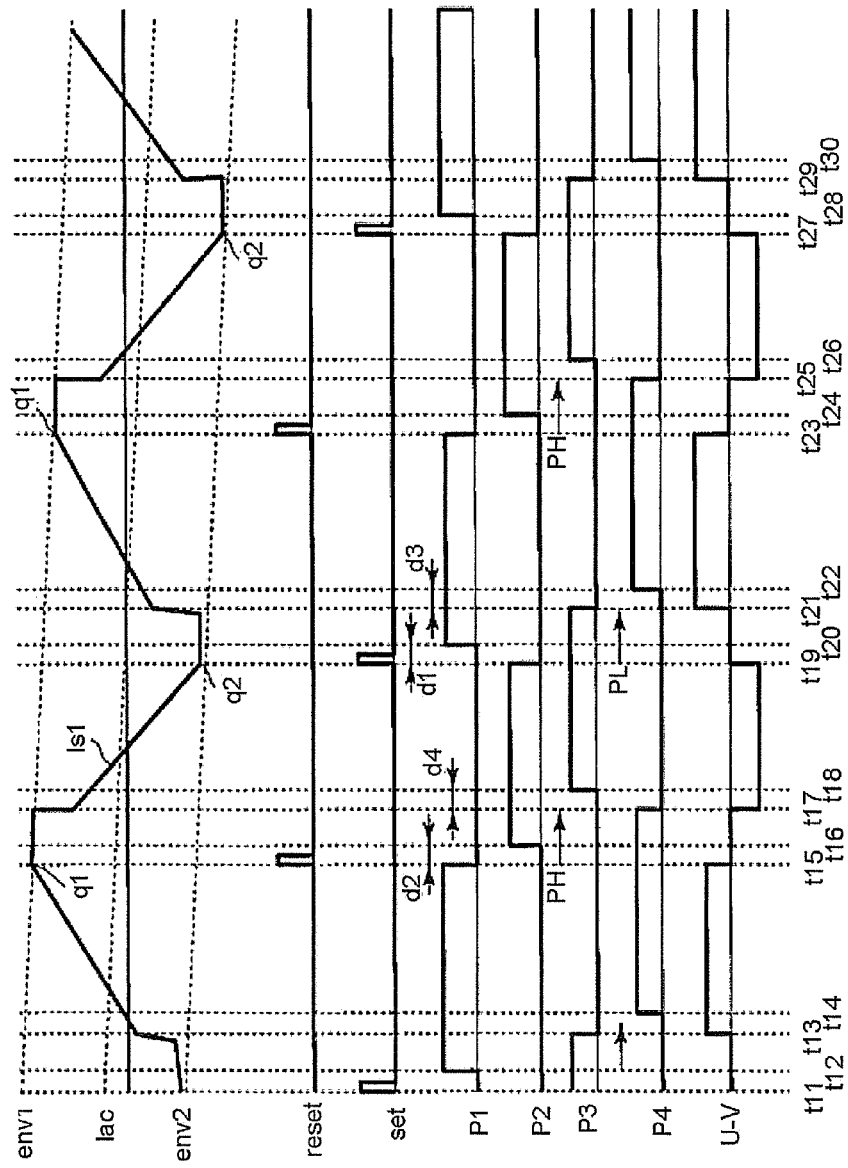
FIG. 16 is a waveform diagram illustrating the actions of a first and a second functional section according to a fifth embodiment.

FIG. 16 shows an input current Iac in the power converter 500, a circuital current Is1, a reset pulse signal 'reset', a set pulse signal 'set', gate drive signals P1-P4 corresponding to the first to the fourth switch S1-S4 and a potential difference 'U–V' between the U terminal and the V terminal. Different from in the power converter 400, in the power converter 500, the waveform of the circuital current Is1 is generated by the potential difference 'U–V'. In the power converter 500, an interval in which current change corresponding to a phase shift in the waveform of the circuital current Is1 is stagnated is added on the basis of the actions described with reference to the waveform diagram shown in FIG. 10.

As stated above, the insulated load 5 can be powered by the alternating voltage power supply Vac through few components by implementing a single control. In this case, as power conversion is achieved in one section but not in many sections, the efficiency reduction caused by multi-segment conversion is prevented. Typically, as the condition for a ZVS action is compensated, power conversion is achieved efficiently at less switching loss. Moreover, as controllable measures are taken in real time corresponding to the variation in the load 5, and the regulation on an output voltage is highly precise. On the other hand, as harmonic suppression for an input current is separated from the regulation on an output voltage, and a control is carried out by taking the average of input voltages in each cycle, the input current is not slanted even if the load 5 is changed. Through the foregoing processing, the insulated alternating current/direct current power supply can be very useful in the industrial field.

Further, the present invention is not limited to the foregoing embodiments.

For example, in the power converter 400 of the fourth embodiment, a third delay generation portion 653 and a fourth delay generation portion 654 are arranged at the rear end of the first shift amount adjustment portion 651 and the second shift amount adjustment portion 652. However, the power converter 400 is not limited to be this structure. As other embodiments, the output of the first delay generation portion 622 is divided into two parts: one part output as a gate drive signal P1 corresponding to the first switch S1, and the other part output to the first shift amount adjustment portion 651. Then, the delayed positive logic signal added with a shift amount generated by the first shift amount adjustment portion 651 is output as a gate drive signal P4 corresponding to the fourth switch S4. Similarly, the output of the second delay generation portion 623 is divided into two parts: one part output as a gate drive signal P2 corresponding to the second switch S2, and the other part output to the second shift amount adjustment portion 652. Then, the delayed opposite logic signal added with the shift amount by the second shift amount adjustment portion 652 is output as a gate drive signal P3 corresponding to the third switch S3. With this structure, the third delay generation portion 653 and the fourth delay generation portion 654 can be saved in the power converter 400.

Further, in the first shift amount adjustment portion 651 and the second shift amount adjustment portion 652, sine wave 'sin' is the generation source of a shift amount; however, the present invention is not limited to this. For example, the shift amount may be a fixed or calculated according to an input voltage, a boost voltage or the like.

Further, in each embodiment, the first functional section and the second functional section of the control unit 6 may be formed by software but not hardware.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A power converter, comprising:
a power conversion circuit configured to connect a first switch with a second switch in series while connecting a third switch with a fourth switch in series; separately connecting the first switch with the third switch and the second switch with the fourth switch; connecting a second capacitor with two ends of the third switch and the fourth switch; connecting a series circuit comprising a first capacitor and a second inductor with a series circuit composed of a third capacitor and a primary winding of a transformer in parallel at the connection point of the first and the second switch and the connection point of the third switch and the fourth switch; connecting a first diode, a third inductor and a fourth capacitor in series in a closed manner at one side of a secondary winding of the transformer; connecting a second diode, a fourth inductor and the fourth capacitor in series in a closed manner at another side of the secondary winding of the transformer; connecting a series circuit comprising an alternating voltage power supply and a first inductor (in parallel) with two ends of the first capacitor; connecting a load with two ends of the fourth capacitor; and
a control section comprising a control unit, the control section configured to supply, in order to make a current resulting from mixing a low-frequency component of the alternating voltage power supply with a high-frequency component flow through the power conversion circuit, pulse signals for alternatively opening and closing a first group consisting of the first switch and the fourth switch and a second group consisting of the second switch and the third switch to the first group and the second group based on an input voltage obtained by a unit for detecting a voltage input from the alternating voltage power supply, an output voltage obtained by a unit for detecting a voltage output to the load, a circuital current obtained by a unit for detecting a current flowing through the power conversion circuit and a smoothed voltage obtained by a unit for detecting the voltage of the second capacitor, the control unit further comprising a sine wave generation unit configured to generate a sine wave having the same phase with voltage of the alternating voltage power supply based on the signal of the alternating voltage detected by the alternating voltage detection unit.

2. The power converter according to claim 1, wherein
a unit for detecting the current flowing through the power conversion circuit, is configured to detect a current of a series of the first capacitor and the second inductor that are connected between the connection point of the first switch and the second switch and the connection point of the third switch and the fourth switch.

3. The power converter according to claim 2, wherein
the unit for detecting the current flowing through the power conversion circuit detects the amount of two currents configured to include one current of a series of the first capacitor and the second inductor that connects between the connection point of the first switch and the second switch, and the connection point of the third and the fourth switch and another current of a series of the third capacitor and the primary winding of the transformer that connects between the connecting point of the first switch and the second switch and the connection point of the third and the fourth switch.

4. The power converter according to claim 1, wherein the control unit further comprises:
an envelope generation unit configured to determine the target value of a current flowing to the alternating voltage power supply based on the sine wave generated by a voltage signal detected by a load voltage detection unit and a voltage signal detected by a second capacitor voltage detection unit, cause the target value to have a specific width and generate a plus current side envelope and a minus current side envelope;
a determination unit configured to determine whether or not the circuital current detected by the circuital current detection unit is within the range between the plus current side envelope and the minus current side envelope; and
a pulse generation unit configured to generate, using the determination unit, the pulse signal at the timing in which the circuital current is beyond the limits of the range between the plus current side envelope and the minus current side envelope.

5. The power converter according to claim 4, wherein the control unit further comprises:
a correction unit configured to set a ZVS compensation threshold value to correct the plus current side envelope so that the plus current side envelope is not below the ZVS compensation threshold value and correct the minus current side envelope so that the minus current side envelope is not above the ZVS compensation threshold value.

6. The power converter according to claim 1, wherein the switching timing of the first group consisting of the second switch and the third switch is delayed by a designated time with respect to the switching timing of the second group consisting of the first switch and the fourth switch.

7. The power converter according to claim 6, wherein the switching timing of the first group consisting of the first switch and fourth switch is delayed by a designated time, while the switching timing of the second group consisting of the second switch and third switch is delayed by a designated time.

* * * * *